United States Patent [19]
Sawyer

[11] Patent Number: 5,849,468
[45] Date of Patent: Dec. 15, 1998

[54] SPECKLELESS ILLUMINATION OF OBJECTS BY LASER LIGHT RESULTS WHEN THE LASER LIGHT IS TRANSMITTED OR IS REFLECTED BY A MOVING DIFFUSER

[76] Inventor: George M. Sawyer, 7251 Garden Grove Blvd., No. #E, Garden Grove, Calif. 92641

[21] Appl. No.: 437,235

[22] Filed: May 8, 1995

Related U.S. Application Data

[63] Continuation of Ser. No. 292,318, Aug. 19, 1994, Pat. No. 5,449,597, which is a continuation of Ser. No. 168,274, Dec. 15, 1993, abandoned, which is a continuation of Ser. No. 737,889, Jul. 25, 1991, abandoned, which is a continuation of Ser. No. 291,535, Dec. 27, 1988, abandoned, which is a division of Ser. No. 920,782, Oct. 20, 1986, Pat. No. 4,835,090, which is a continuation-in-part of Ser. No. 699,504, Feb. 8, 1985, abandoned, which is a continuation of Ser. No. 539,640, Oct. 5, 1983, abandoned, which is a continuation of Ser. No. 348,610, Feb. 12, 1982, abandoned, which is a continuation of Ser. No. 72,209, Jul. 4, 1979, abandoned, which is a continuation of Ser. No. 72,197, Sep. 14, 1970, Pat. No. 4,178,181, which is a continuation of Ser. No. 544,275, Apr. 21, 1966, abandoned.

[51] Int. Cl.$^6$ .............................. G03C 7/00; G03C 5/08; G03C 5/04; G03B 27/54

[52] U.S. Cl. ........................... 430/363; 430/395; 430/397; 355/67; 359/226; 359/196; 359/223; 359/599; 396/155

[58] Field of Search ..................................... 430/395, 397, 430/363; 359/226, 196, 599, 223; 354/150; 355/67; 396/155

[56] References Cited

U.S. PATENT DOCUMENTS

| 3,587,424 | 6/1971 | Paine | 359/599 |
|---|---|---|---|
| 3,754,814 | 8/1973 | Leith | 359/599 |
| 4,035,068 | 7/1977 | Rawson | 359/599 |

*Primary Examiner*—Richard L. Schilling

[57] ABSTRACT

When laser light is transmitted by or is reflected by a diffuser onto an object being illuminated, the object is not evenly illuminated, but is speckled with large speckles.

The invention uses a moving diffuser which reduces the sizes of the speckles when the object is visually observed, and eliminates the speckles when a photographic film or plate is located at the object position and records the laser light.

10 Claims, 8 Drawing Sheets

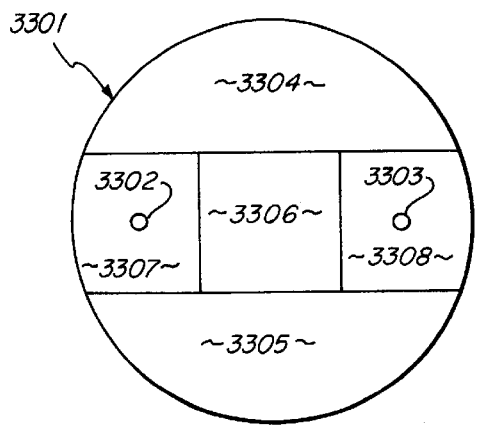
FIG. 33
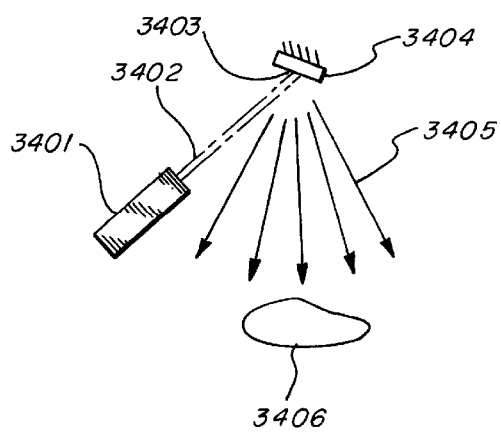
FIG. 34
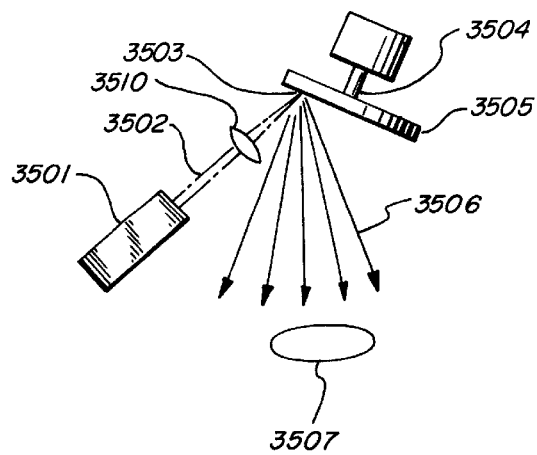
FIG. 35
FIG. 36
OMITTED

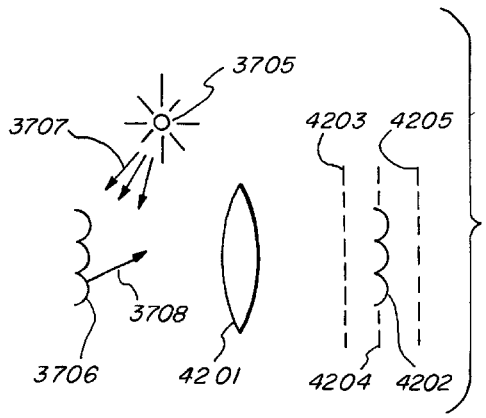
FIG. 42
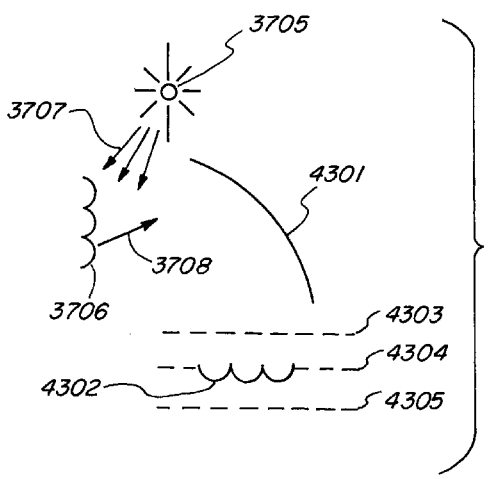
FIG. 43
FIG. 44
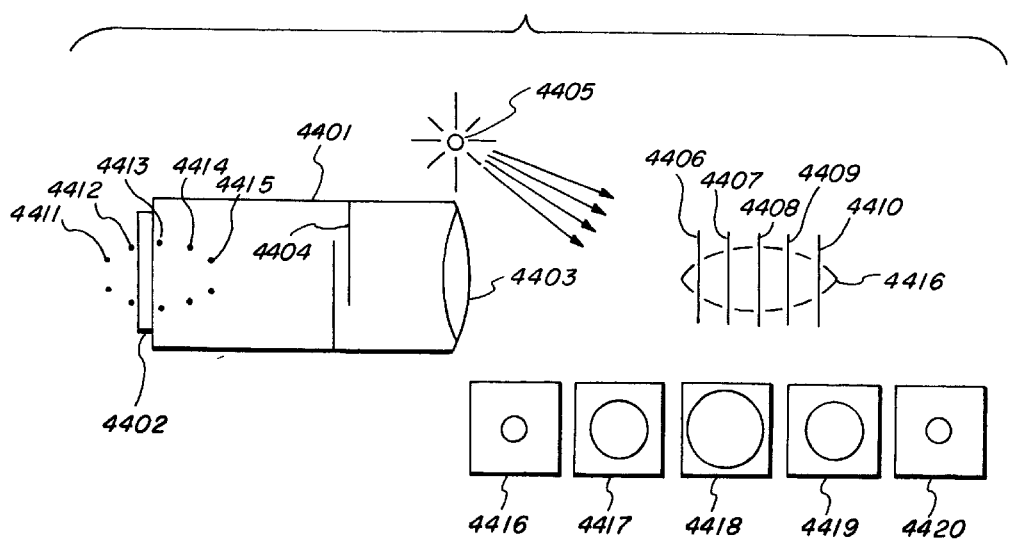

SPECKLELESS ILLUMINATION OF OBJECTS BY LASER LIGHT RESULTS WHEN THE LASER LIGHT IS TRANSMITTED OR IS REFLECTED BY A MOVING DIFFUSER

CONTINUING DATA AS CLAIMED BY APPLICANT

THIS APPLN IS A CON OF Ser. No. 08/292,318 Aug. 19, 1994, now U.S. Pat. No. 5,449,597,
  WHICH IS A CON OF Ser. No. 08/168,274 Dec. 15, 1993 ABN
  WHICH IS A CON OF Ser. No. 07/737,889 Jul. 25, 1991 ABN
  WHICH IS A CON OF Ser. No. 07/291,535 Dec. 27, 1988 ABN
  WHICH IS A DIV OF Ser. No. 06/920,782 Oct. 20, 1986 U.S. Pat. No. 4,835,090
  WHICH IS A CIP OF Ser. No. 06/699,504 Feb. 08, 1985 ABN
  WHICH IS A CON OF Ser. No. 06/539,640 Oct. 05, 1983 ABN
  WHICH IS A CON OF Ser. No. 06/348,610 Feb. 12, 1982 ABN
  WHICH IS A CON OF Ser. No. 06/072,209 Sep. 04, 1979 ABN
  WHICH IS A CON OF Ser. No. 05/072,197 Sep. 14, 1970 U.S. Pat. No. 4,178,181
  WHICH IS A CON OF Ser. No. 04/544,275 Apr. 21, 1966 ABN

RELATED PUBLICATIONS (James. 1948.) James, T. H., and Higgins, George C., *Fundamentals of Photographic Theory*, Wiley, New York, 1948, page 15.

(Lipton. 1965.) Lipton, L., *Popular Photography*, Mar. 1965, pages 63,98,99.

(Mack. 1939.) Mack, J. E., and Martin, M. J., *The Photographic Process*, McGraw Hill, New York, 1939, pages 168, 180, 181, 364.

(Mees. 1937.) Mees, C. E. K., *Photograph*, Macmillan, New York, 1937, pages 63,64,65.

(Mees. 1942.) Mees, C. E. K., *Theory of the Photographic Process*, 1st ed., Macmillan, New York, 1942, pages 34, 35, FIG. 14.

(Mees. 1954.) Mees, C. E. K., *Theory of the Photographic Process*, 2nd ed., Macmillan, New York, 1954, pages 23, 27, 28, 29, 34, 35.

(Mees. 1961.) Mees, C. E. K., *From Dry Plates to Ektachrome Film*, Ziff-Davis, New York, 1961, page viii.

(Mees. 1966.) Mees, C. E. K., *Theory of the Photographic Process*, 3rd ed., Macmillan. New York, 1966, pages 31, 36, 37, and cover.

(Sears. 1946.) Sears, F. W., *Principles of Optics III*, Addison-Wesley, Cambridge, Mass, 1946, pages 159, 160, 161.

(Wall. 1922.) Wall, E. J., *Practical Color Photography*, American Photographic Society, Boston, 1922, page 224.

(Wood. 1962.) Wood, R. W., *Physical Optics*, Macmillan, New York, 1962, pages 214, 215.

The foregoing references are explicitly made a part of this specification as background information for the Lippmann process.

BACKGROUND OF THE INVENTION

1. Field of the Invention

The present invention is in the field of photography, and more particularly relates to layered photo-sensitive elements, where one of the layers is a photo-sensitive layer and where one of the layers is a reflector, to methods of preparing these elements, to methods for the use of the elements, and to methods of using the resulting photographs.

2. The Prior Art

The conventional Lippmann process of color photography was invented by Gabriel Lippmann in 1891. The process was different in many ways from ordinary photographic processes. Without dyes, color photographs were produced based on the principles that produce color in soap bubbles. An extraordinarily fine grained, black-and-white film was used. While in ordinary photography one seeks to supress the reflections off the back side of the photo-sensitive element (film or plate) during exposure by the use of a dark anti-halation coating, the Lippmann process requires a mirror reflector of liquid mercury to back the film. Lippmann's process produces a photograph with a 2-dimensional image.

Some Details of the Lippmann Process. With Comments.

The Lippmann Light-Sensitive Element

1. The Lippmann light-sensitive element is a layered assembly that includes (a) a light-sensitive (emulsion) layer, (b) a light-sensitive (emulsion) layer support, and (c) a parallel reflecting layer of liquid mercury. These essential items are shown in FIG. 1 that shows the Lippmann light-sensitive element 101, mercury reflecting layer 102, light-sensitive (emulsion) layer 103, emulsion layer support layer 104, camera housing 105 with lens 106, subject 107, light source 108 and light from the subject 109.

2. The mercury reflector is a non-angular reflector in that it reflects light in the same direction as the specularly reflected ray from the nominal surface, not at an angle to the specularly reflected ray from the nominal surface. (An angular reflector reflects light at an angle to the specularly reflected ray from the nominal surface.) The mercury is a specular reflector. (The surface of the mercury is indeed the nominal surface. Angular and non-angular reflectors are discussed elsewhere in this disclosure.)

3. The light-sensitive (emulsion) layer contains light-sensitive grains.

4. They are characterized as being spherical in shape.

5. They are suspended within a transparent material (gelatin).

6. Their average diameter is equal to or less than a "given value."

7. Their average diameter is about ⅛th of the shortest wavelength of light to be recorded, or less.

8. Their average diameter is about 50 nanometers or less, when photographing in the visible light range (400 to 700 nanometers).

9. They contain at least one silver halide. Example: silver bromide.

10. The minimum thickness of the light-sensitive (emulsion) layer must be at least as thick as 2 planes (described later) for the process to work. The longer the wavelength, the farther apart are the planes. The minimum thickness of the light-sensitive (emulsion) layer is at least equal to the longest wavelength of light (in air) to be recorded divided by 3 (in order to be at least as thick as 2 planes).

The Method of Using the Lippmann Light-Sensitive Element Includes the Following Essential Steps During Exposure:

11. The light-sensitive element is exposed to light from only one side of the element. FIG. 1 shows the light-sensitive element 101 being exposed to light from only one side of the element.

12. The incident light from the subject and its reflection interfere, within the light-sensitive (emulsion) layer, causing an interference pattern of light waves to exist within the light-sensitive layer during exposure.

13. These patterns are a series of parallel planes of light (separated by planes of darkness) and are parallel to the reflecting surface and layers of the assembly. The parallel planes of light are spaced at about ⅓rd of the wavelength (in air) of the light. The light-sensitive layer must be able to record these planes that are spaced at about ⅓rd of the shortest wavelength (in air) of the light to be recorded.

14. Thus, during exposure, interference patterns (planes) produced by light waves are present within the light-sensitive layer. They are parallel to the reflecting surface (that is the nominal surface), regardless of the angle the incident ray makes with the reflecting surface.

15. The light-sensitive grains are required to be able to record these interference patterns (planes).

16. The light-sensitive grains do record these interference patterns (planes), which are parallel to the reflecting surface. Or, the recording of the interference patterns of light waves within the light-sensitive layer takes place by exposing the light-sensitive grains.

The Method of Using the Lippmann Light-Sensitive Element Includes the Following Essential Steps After Exposure:

17. The reflecting layer is removed.

18. Viewing the photograph (or detecting the image) requires the interference of light waves.

19. The image is stored within the emulsion layer as partially reflecting layers (at least 2) that are parallel to the emulsion surface rather than as relief on the surface of the emulsion.

Viewing Problems of Photographs

As background information, the reflections from various types of photographs is considered.

Mat Finish Photograph Viewing Problem. The reflections from a photograph with a mat finish are shown in FIG. 2; it shows the photograph 201, a small portion of the photograph 202, a light source 203, an incident light ray 204, diffuse reflections from the surface 205 which spread out equally in all directions, and diffuse reflections 206 from the image beneath the surface which spread out in all directions. From any viewpoint 207, some surface reflections 205 are seen along with the image reflections 206. The mat finish photograph has the advantage of eliminating very bright surface reflections, but the contrast between the lightest and darkest parts of the image is not as great as in a photograph with a glossy finish.

Glossy Finish Photograph Viewing Problem. The reflections from a photograph with a glossy finish are shown in FIG. 3; it shows the photograph 301, a small portion of the photograph 302, a light source 303, an incident light ray 304, the specular reflection from the surface 305 (There is only one reflection from the surface and it is in the direction of specular reflection. Specular reflection is the kind of a reflection that occurs from a common household mirror or from a polished metal surface, as from silver or chromium.), and diffuse reflections 306 and 308 from the image beneath the surface. From any viewpoint 307, no surface reflections are seen, unless that viewpoint happens to be from the direction of specular reflection 309 where the viewer will see a large surface reflection 305 and a small image reflection 308; in this case, the specular surface reflection 305 obscures the reflection from the image, 308. At all viewpoints, other than at 309, the viewer sees only the reflection 306 from the image below the surface, and the contrast between the lightest and darkest parts of the image is great. The problem of the surface reflection obscuring the image reflection is easily solved by tilting the photograph or by changing the viewing position so that the specular surface reflection 305 is out of the way. One automatically does this when viewing a glossy photograph.

Lippmann Photograph Viewing Problem. The reflections from a standard Lippmann photograph are shown in FIG. 4: it shows the photograph 401, a small portion of the photograph 402, a light source 403, an incident light ray 404, the specular reflection from the surface 405, and the specular reflection from the image beneath the surface 408. (Because the image is a series of partially reflecting planes parallel to the surface of the photograph, the specular reflections from the surface 405 and from the image 408 are in the same direction.) From any viewpoint 407, no surface reflections are seen, unless that viewpoint happens to be from the direction of specular reflection 409 where the viewer will see the surface reflection 405 and the image reflection 408; the specular surface reflection 405 obscures the reflection from the image, 408. At all viewpoints, other than at 409, the viewer sees neither the reflection 408 from the image below the surface nor the surface reflection 405. The problem is that the surface reflection 405 obscures the view of the image reflection 408 from beneath the surface. It is not easily solvable by tilting the photograph or by changing the viewing position so that the reflection from the surface 405 is out of the way and the reflection from the image beneath the surface 408 is seen; the image is invisible from viewpoints 407. As shown in FIG. 4, it is not possible to view the Lippmann photograph image 402 without the surface reflection 405 obscuring the view of the photographic image.

The problem is especially acute when the Lippmann image 408 is weak and the surface reflection 405 remains strong.

It is one of the major problems of the Lippmann process.

U.S. Pat. No. 4,178,181 column 6, lines 34 through 38 states "One of the disadvantages of the standard Lippmann photograph is that the viewing angle is critical with respect to the light source. Lippmann reported that the colors are visible only in the direction of the specular reflection, and are invisible in every other direction."

The Problem. What one wants to do is to be able to see the image reflection 408 without seeing the surface reflection 405 at the same time. In other words, one wants to view the photograph's image 402 without the view being obscured by the surface reflection 405. (If one could view the image reflection 408 without seeing the surface reflection 405, the result would be profound in that all the light reflected from the image 408 is in one direction, and therefore extraordinarily bright, and the contrast between the lightest (extraordinarily bright) and darkest parts (virtually no light) of the photograph would be greater than in either the mat finish photograph or the glossy finish photograph cases of FIGS. 2 or 3.)

Prior Art Solution (Wedge). Prior art attaches a wedge to the completed Lippmann photograph of FIG. 4 resulting in the configuration of FIG. 5 which shows the Lippmann photograph 401, a small portion of the photograph 402, a light source 403, an incident light ray 404, the wedge 501, the specular reflection from the surface of the assembly 505, the specular reflection from the image 508, and the viewing position 509 from which the image reflection 508 can be seen. All other viewing positions, as shown by 507, see neither the image reflection 508 nor the specular surface reflection 505. The image is extraordinarily bright, and the contrast is great. Wedges have been made of glass and of liquid.

Prior Art Solution Is Impractical. The use of the wedge is the only prior art (prior to 1966) solution to the surface reflection problem known to the inventor. A 10 degree glass wedge that covers an area of 4 by 5 inches is over ½ inch thick, at its thickest point, weighs over ½ pounds and is, of course, inflexible. For these reasons, the inventor believes the wedge is an impractical solution because the photograph cannot, from practical considerations, be placed in a conventional photograph album. The use of the wedge is also illustrated in U.S. Pat. No. 4,178,181, FIG. 3a.

SUMMARY OF THE CLAIMED INVENTION

The invention is a method of making colored photographs with 3-dimensional images (or 3-dimensional photographs). It is basically an improvement over the Lippmann method of colored photography which records the interference patterns of light waves in a photo-sensitive medium.

The Lippmann method makes photographs with 2-dimensional images (or 2-dimensional photographs). The interference patterns of light waves that are recorded are stacks of parallel planes that are parallel to the nominal surface of the reflector that he used during exposure. The reflector that he used was a plane, specular reflector of liquid mercury.

The invention method makes photographs with 3-dimensional images. The interference patterns of light waves that are recorded are stacks of parallel planes, as in the Lippmann process, but are positioned perpendicular to the incident light rays, and are generally not parallel to the nominal surface of the retro-reflector.

The principal modification of the Lippmann process is the substitution of a retro-reflecting layer for the specularly reflecting layer of mercury. The peculiarity of the retro-reflector is that it reflects an incident light ray back along the incident light path rather than in the direction of specular reflection. It is thus an angular reflector because the light reflected from the reflector is at an angle to the specularly reflected ray from the nominal surface.

The photo-sensitive element is a layered assembly where one layer is a photo-sensitive layer and another layer is the retro-reflecting layer.

The element can be made thin enough to be used in film, as opposed to glass plate, applications.

When a lens is used to image the subject, the image may be positioned to be in front of, on, or behind the photo-sensitive element. This results in a photograph where the image of the subject appears in front of, on, or behind the surface of the photograph.

The photograph may be viewed from either side by reflected light and the subject appears as an orthoscopic or pseudoscopic view. The side away from the viewer may be painted black.

Because the reflector that is used during exposure is an angular reflector, the photograph that results therefrom can be viewed without the same disturbing surface reflections that obscure the viewing of Lippmann photographs. Thus, the utilization of the retro-reflector is one way to make a light-weight, thin, and flexible photograph, as the need for the attachment of a thick, heavy, inflexible wedge is obviated.

By using the invention, a single 3-dimensional photograph may be made from 2-dimensional cross sections of 3-dimensional subjects. Here, the same photo-sensitive element is exposed sequentially to photographs or to video display terminals, as examples, which represent cross sections of 3-dimensional subjects. During each of the multiple exposures, the image of each cross section of the subject is optically positioned at a different distance from the photo-sensitive element. This can be accomplished by varying the distances from the photo-sensitive element to the lens, and the distance from the lens to the subject may remain fixed for all of the multiple exposures. This also can be accomplished by varying the distances from the lens to the subject, and the distance from the lens to the photo-sensitive element may remain fixed for all of the multiple exposures. This also can be accomplished in other ways apparent to a person skilled in the art. The invention has particular application in medical imaging and in displaying seismic data.

The 3-dimensional photography of the invention is facilitated by the use of one or more multiple monochromatic light sources illuminating the subject.

DEFINITIONS

As used in this specification and claims

Light means electromagnetic radiation, unless visible light is specified in which case that portion of the electromagnetic spectrum with wavelengths from 400 to 700 nanometers is indicated.

Photo-sensitive is the same as light-sensitive.

The emulsion or emulsion layer is the same as the photo-sensitive layer in a layered photo-sensitive element; the layer which records the image of the subject; the image carrying layer of a completed photograph. The emulsion need not be in any technical sense a true emulsion.

A sheet is a broad, thin, often rectangular mass of any material; a coating on a surface.

A layer is a single thickness, coating or stratum spread out or covering a surface; one sheet of a stack of 2 or more sheets wherein the sheets are essentially parallel to one another.

Photography is the art or practice of producing an image of subjects upon a photo-sensitive layer by the chemical action of light or other radiant energy; the art of reproducing photographs from sensitive substances in permanent form.

A photographic system is one in which light is emitted from the subject, wherein some of said light from the subject falls upon a photo-sensitive medium (or element) and is recorded (or made visible) by said photo-sensitive medium. The light from the subject may be reflected light from a light source or the subject may be self-luminous. An image forming element may be located between the subject and the photo-sensitive element.

An image forming element is an element capable of forming (or contributing to the formation of) an image of a subject. The image may be real or virtual. The element may be a refractive element (a glass lens is an example) or it may be a reflective element (a concave metal mirror is an example). Holographic elements functioning as image forming elements are included.

A specularly reflecting surface is a like a common household mirror, a polished metal surface, or the shiny side of common household aluminum foil. When a ray of light is incident on a specularly reflecting surface and at an angle to it, this angle is called the angle of incidence; the angle of reflection is equal to the angle of incidence. The reflected ray and the incident ray make an angle with respect to each other, or are not parallel (except in the trivial case of the incident ray being perpendicular to the surface at which time the incident and reflected rays coincide in position but are in opposite directions).

A retro-reflecting layer is a layer, a surface, or a sheet, of material that reflects light in such a way that an incident ray is essentially coincident with the reflected ray; the incident ray and the reflected ray travel in opposite directions. FIG. 3 is a retro-reflecting layer showing a retro-reflecting layer 301, a light source 302, an incident ray 303, and the reflected ray 304 which is coincident with the incident ray 303 but in the opposite direction.

A photograph is an image of a subject produced by a photo-sensitive sheet.

If a photograph is a recording of the interference patterns of light waves that existed within the photo-sensitive layer during exposure, and if said interference patterns were due to incident light waves interfering with their reflections from a reflector that formed one layer of a photo-sensitive element, and if viewing the image of the photograph requires the interference of light waves, the photograph is an interference photograph.

A photo-sensitive layer is a layer, a sheet, or a surface that either is or contains light-sensitive material. A photo-sensitive element is a layered assembly wherein at least one of the layers is photo-sensitive. Silver halides and dichromated gelatin are common light-sensitive materials. Other materials that are light sensitive and that can form photo-sensitive layers are given within the publications under the heading "Related Publications." These and other less common light-sensitive materials that are useful in the invention are discussed, along with requirements for exposing and processing, in the following references:

(Collier. 1971) Collier, R. J., Burckhardt, C. B., and Lin, L. H., *Optical Holography*. Academic Press, New York, 1971.

(Wolf. 1983) Wolf, E., et al., *Progress in Optics Volume XX*. North Holland, Amsterdam and New York, 1983.

(Goodman. 1980) Goodman, J. W., Ross, M., Erf, R. K., Korpel, A., Starkweather, G. K., *Laser Applications*. Vol. 4. Academic Press, New York, 1980.

(Smith. 1977) Smith, H. M., Bartolini, R. A., Biedermann, K., Bordogna, D., Duncan, R. C. Jr., Keneman, S. A., Meyerhofer, D., Staebler, D. L., Urbach, J. C., *Holographic Recording Materials*. Springer-Verlag, Berlin and New York, 1977.

(Jeong. 1982) Jeong, T. H., Editor, *Proceedings of the International Symposium on display Holography*. Holography Workshops, Lake Forest College, Lake Forest College, Lake Forest, Ill. 60045, July 12–16, 1982.

The terms "angular reflector." "angular reflector layer," and "angular reflecting layer" are defined under the heading "Definition of an Angular Reflector."

The term "non-angular reflector" is defined under the heading "Definition of a Non-Angular Reflector."

The term "retro-reflecting element" is defined under the heading "Definition of a Retro-Reflecting Element."

The term "retro-reflecting sheet" is defined under the heading "Definition of a Retro-Reflecting Sheet."

A retro-reflecting photo-sensitive element is a layered assembly wherein at least one of the layers is a photo-sensitive layer and wherein one of the layers is a retro-reflecting layer. FIG. 31 shows a retro-reflecting photo-sensitive element 3101, wherein a photo-sensitive layer 3103, and a retro-reflecting layer 2801 is shown. Other layers may and may not be a part of the element. One of them can be the glue layer 3102. Other layers not shown, but that may be present, are an anti-reflecting layer and filter layers. Other layers could be added as would be readily apparent to one skilled in the art.

A Lippmann photograph is a photograph that was made exactly (as far as is known) as Gabriel Lippmann made his photographs.

A Lippmann type photograph is a photograph that has at least some of its features (either as to how it was made or as to the properties of the completed photograph) like a "Lippmann photograph."

BRIEF DESCRIPTION OF THE DRAWINGS

FIG. 33 is an axial view of a large lens useful in the 3-dimensional photography of the invention.

FIG. 34 shows a laser illumination system and diffuser.

FIG. 35 shows a laser illumination system and a moving diffuser.

FIG. 36 is omitted.

FIG. 42 shows a 3-dimensional photographic system that uses a lens.

FIG. 43 shows a 3-dimensional photographic system that uses a reflector.

FIG. 44 shows a 3-dimensional photographic system that converts a series of 2-dimensional cross sectional pictures of a 3-dimensional object into a single 3-dimensional photograph.

2. Another object of the invention is to find a way to make a camera that takes colored 3-dimensional photographs, that employs the interference of light waves, that where, during exposure, the distance between the camera and the subject can move more than one wavelength of light, and where this is accomplished by changing the nature of the reflector used during exposure in the Lippmann process of color photography.

3. Another object of the invention is to find a photographic system that makes a 3-dimensional photograph from 2-dimensional cross sections of a subject by exposing a single photo-sensitive element sequentially to each of the 2-dimensional cross sections and where, during each exposure, the distance between the photo-sensitive element and the subject (a 2-dimensional cross section) can move more than one wavelength of light.

4. Another object of the invention is to find a way to eliminate the thick, heavy, and inflexible wedge that is attached to the surface of a completed Lippmann photograph (a 10 degree wedge suitable for covering a 4x5 inch photograph can be ½ inch thick, weigh ½ pound, and is inflexible) and to accomplish this by changing the nature of the reflector used during exposure in the Lippmann process of color photography. This would result in a thin, flexible photograph suitable for mounting in a conventional photograph album.

5. Another object of the invention is to find a way of conveniently using the same angular reflector to expose multiple photographs.

6. Another object of the invention is to find a way of making improved angular reflectors for use in photo-sensitive elements.

7. Another object of the invention is to find a way of making an improved retro-reflector for use in a photo-sensitive elements.

8. Another object of the invention is to improve the Lippmann photo-sensitive element by using, instead of the specular reflector of mercury, a diffraction grating.

9. Another object of the invention is to find a way of making a lens, that could be used with the photographic system of Item 2 (above), lighter in weight and smaller in size while preserving the horizontal 3-dimensionality of the photographs.

10. Another object of the invention is to find a way of reducing the speckle produced by a laser that is used to illuminate the subject, when exposing a photo-sensitive element.

11. Another object of the invention is to find a transparent, water soluble, thermoplastic glue, with a refractive index of about 1.5, with a softening temperature of less than 200 degrees F., that would be useful as an index matching material or optical cement, and that would be a useful material to use as a temporary glue for bonding together the layers of a layered photo-sensitive element.

NEW ART SOLUTIONS to the

LIPPMANN PHOTOGRAPH VIEWING PROBLEM

Non-Angular and Angular Relationships.

Figure 4:
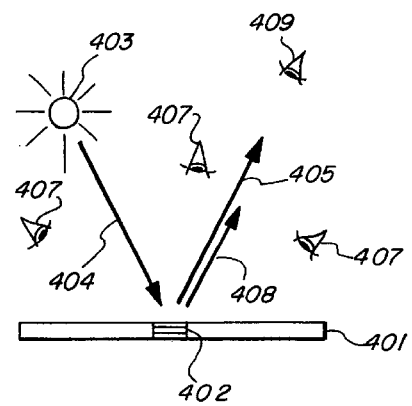
FIG. 4 is a cross section of a Lippmann photograph showing reflections.
Figure 2:
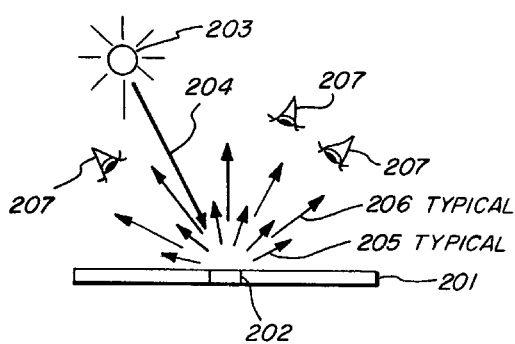
FIG. 2 is a cross section of a mat finish photograph showing reflections.

In FIG. 4, the direction of the surface reflection 405 and the image reflection 408 are in the same direction; there is no angle between them. Their relationship is non-angular. The view of the image is obscured by the surface reflection.

Figure 5:
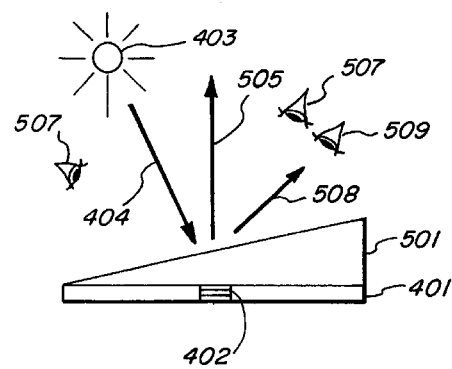
FIG. 5 is a cross section of a Lippmann photograph, with wedge attached, showing reflections.
Figure 3:
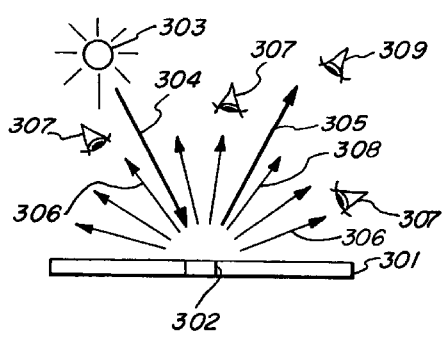
FIG. 3 is a cross section of a glossy finish photograph showing reflections.

In FIG. 5, the direction of the surface reflection 505 and the image reflection 508 are in different directions; there is an angle between them. Their relationship is angular. The view of the image is not obscured by the surface reflection. This is what is wanted.

What is wanted, in conclusion, is a means of achieving an angular relationship in the photograph between the image reflection and the surface reflection.

An Improvement Over A Wedge.

Even though the attachment of a wedge to the completed photograph is believed by the inventor to be impractical, he knows of no other art prior to 1966 that achieves an angular relationship between the image reflection and the surface reflection. The wedge is an attachment to the surface of the photograph. It is attached after the photograph has been completed. Is there a different something that could be attached to the surface of the completed photograph that would result in the desired angular relationship between the image reflection and the surface reflection but have none of the disadvantages of the wedge? Could that something be thin, light weight, and flexible so that one could attach it to a Lippmann type photograph made on flexible film with a resulting photograph that would be practical for mounting in a conventional photograph album?

Such an attachment was revealed in a patent application that was filed in 1966 (U.S. Pat. application Ser. No. 05/544,275). It is described in U.S. Pat. No. 4,178,181 column 6, lines 27–33. The inventor has made an attachment of transparent material of parallel grooves, similar in cross section to that shown in FIG. 7, and attached it to a Lippmann type photograph and it works.

Is There A Better Way?

It would be very neat if it was possible to require nothing to be attached to the completed photograph in order to achieve an angular relationship between the image and surface reflections. In other words, could the need for a wedge or wedge substitute be completely obviated? The previous discussion describes something that is done to the photograph after the photograph is made, not something that is done during the making of the photograph. Could the photo-sensitive element be made in such a way that the resulting photograph would reflect the image reflection in one direction and the surface reflection in another direction?

Is there a way, during exposure, of using some kind of reflector other than the specular reflector used by Lippmann? He used a single, planar, specularly reflecting surface (of liquid mercury).

Figure 6:
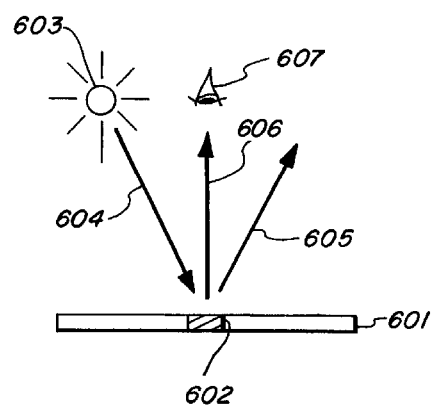
FIG. 6 is a cross section of a photograph showing angular reflections.

The desired result would be achieved in the photograph if the reflector that was used during exposure was such that the patterns of parallel, partially reflecting planes, that form the image of the resulting photograph, were at an angle to the surface of the photograph. This desirable condition is shown in FIG. 6 that shows the photograph 601 and a small portion of the photograph 602 containing patterns of parallel, partially reflecting planes, that form the image of the completed photograph, and that are at an angle to the surface of the completed photograph. Also shown are a light source 603, an incident light ray 604, the specular reflection from the surface 605, and the specular reflection from the image beneath the surface 606. When the viewer observes the photograph from 607, the specular surface reflection 605 is not seen.

The inventor knows of no art prior to 1966 that points out the desirability of such a result nor a photo-sensitive element that produces such a result.

A Discovery Is Made

It was discovered that an "angular reflector," used as part of the photo-sensitive element during exposure, produces the desired result that is:

(1) a photograph that requires the attachment of neither a wedge nor a wedge substitute to the surface of the completed photograph in order to view the image reflection without being obscured by the surface reflection.

(2) a photograph that is thin, light weight, and flexible, and therefore suitable for mounting in a conventional photograph album. The above referenced patent application filed in 1966 (Ser. No. 05/544,275) provided various designs for angular reflectors.

Figure 7:
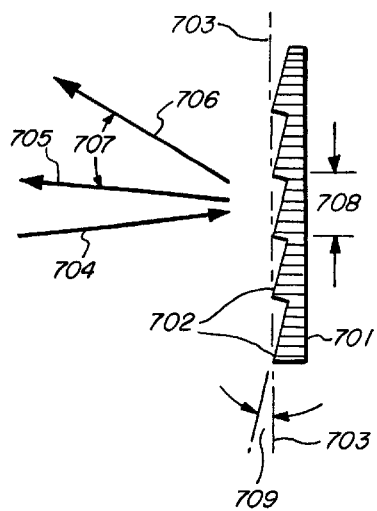
FIG. 7 is a cross section of an angular reflector.

Definition of An "Angular Reflector." An "angular reflector" is a reflecting sheet that reflects fight at an angle to a specularly reflected ray from the nominal surface. FIG. 7 shows an angular reflector. The reflector 701 and subreflectors 702 are shown that are at an angle to the nominal surface 703. An incident ray 704, the specularly reflected ray 705 from the nominal surface 703, the reflected ray (or light) 706 from the angular reflector 701, the angle 707, between the light 706 reflected by the reflector 701 and the specularly reflected ray 705 from the nominal surface 703, is also shown. This reflector 701 is an angular reflector because it reflects light 706 at an angle 707 to the specularly reflected ray 705 from the nominal surface 703. The nominal surface of the reflector is a reference plane useful in describing the angularity of light rays; it is always parallel to the photo-sensitive layer, or layers, when the angular reflector is part of a layered photo-sensitive element. However, there may be other layers between the reflector and the photo-sensitive layer; as an example, a glue layer commonly attaches the reflecting layer to the photo-sensitive layer.

When an angular reflector is a layer of a layered photo-sensitive element, it is designated as the angular reflector, or the angular reflector layer, or the angular reflecting layer.

An index matching material with a refractive index of about 1 ½ usually fills the space between the sub-reflecting surfaces and the nominal surface and it may be a liquid, solid, or a semi-solid.

Figure 8:
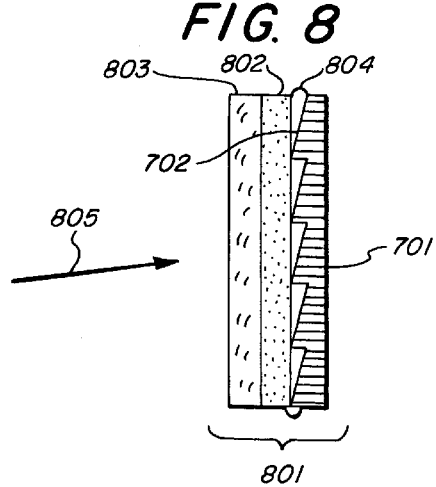
FIG. 8 is a cross section of a layered photo-sensitive element using an angular reflector.

When the angular reflector of FIG. 7 is used as part of a layered photo-sensitive element, FIG. 8 results. It shows the photo-sensitive element 801, the angular reflector 701 with its sub-reflecting surfaces 702, the photo-sensitive layer 802, the photo-sensitive layer support 803, index matching material 804 that fills the space between the surface of the reflector (or the sub-reflecting surfaces) and the photo-sensitive layer, and an exposing ray 805. FIG. 8 may be compared to FIG. 1.

Some Angular Reflectors. Reflectors made up of sub-reflectors with part or all of their surfaces at an angle to the nominal surface are angular reflectors. A diffraction grating used as a reflector is an angular reflector. A layer of paint with reflective metallic pigment particles is an angular reflector. A retro-reflecting sheet is an angular reflectorA diffuse surface, as the dull side of common household aluminum foil, is an angular reflector.

The effect of using an "angular reflector," as part of the photo-sensitive element during exposure, is that the patterns of parallel, partially reflecting planes, that form the image of the resulting photograph, are at an angle to the surface of the photograph; this has the desirable consequence of producing a photograph where the image reflection is in one direction and the surface reflection is in another direction (see FIG. 6).

An "angular reflector" that has been made and successfully used by the inventor as part of a photo-sensitive element is shown in FIG. 7. The angular reflector is a sheet where the surface is covered with straight parallel grooves with a sawtooth cross section. FIG. 7 shows the reflector 701, the sub-reflector surfaces 702 that are metalized and specularly reflecting, the groove spacing 708 that is 0.001 inch, the nominal surface 703, and the angle 709 between the sub-reflector surfaces 702 and the nominal surface of the reflector 703, which is about 6 degrees.

FIGS. 4a, 4b, and 4c, of U.S. Pat. No. 4,178,181 show "angular reflectors" and they are described in the specification. The terms "angular reflector" and "sub-reflectors" are not used in the specification of U.S. Pat. No. 4,178,181.

Definition of A "Non-Angular Reflector. A "non-angular reflector" is a reflector that does not reflect light at an angle to a specularly reflected ray from the nominal surface. The reflected light from the reflector and the specularly reflected ray from the nominal surface are in the same direction.

Figure 9:
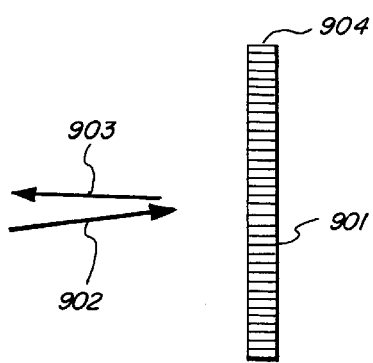
FIG. 9 is a cross section of a non-angular reflector.

Some Non-Angular Reflectors. The Lippmann reflector is "non-angular" in that it is a reflector that does not reflect light at an angle to a specularly reflected ray from the nominal surface. The reflecting surface is indeed the nominal surface. Thus, the light reflected from the reflector and the nominal surface is one and the same. FIG. 9 shows a Lippmann reflector 901, the reflecting surface and nominal surface 904, an incident light ray 902, and specularly reflected ray 903 from the nominal surface and from the mercury surface 904. The reflector used by Lippmann (liquid mercury) takes the form of the surface against which the mercury rests, which is the emulsion surface, and the emulsion surface is a specular reflector.

Figure 10:
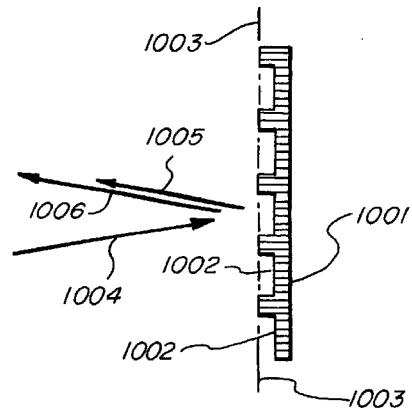
FIG. 10 is a cross section of another non-angular reflector.

Another "non-angular" reflector is shown in FIG. 10 where the reflector 1001, the sub-reflecting surfaces 1002, and the nominal surface 1003 are shown. An incident light ray 1004, light reflected from the reflector 1005, and the specularly reflected ray 1006 from the nominal surface 1003 are shown. The light 1005 reflected from the reflector 1001 is in the same direction as the light ray 1006 reflected from the nominal surface 1003. They do not make an angle with one another. This is a "non-angular" reflector (it is a reflector that does not reflect light at an angle to a specularly reflected ray from the nominal surface).

A Better Solution. 1966 Patent Application. A better solution (than the wedge or a wedge substitute) makes the image of a Lippmann type photograph viewable without being obscured by the surface reflection; It was revealed in the 1966 patent application which resulted in U.S. Pat. No. 4, 178,181. The solution was to use, during exposure (instead of the non-angular reflector of prior art and used by Lippmann, which was a single, plane, specularly reflecting surface), an angular reflector that is made up of a multiplicity of tiny sub-reflecting surfaces that are rounded bumps, flat or irregular surfaces, or paint particles; the sub-reflector surfaces are angled with respect to the reflector's nominal surface. These small sub-reflecting surfaces that are rounded or flat are described in U.S. Pat. No. 4,178,181, column 6, lines 38 through column 7 line 2, and are shown in FIGS. 4a, 4b, and 4c. These are "angular reflectors" although not described by the term "angular reflector" in the patent. They have sub-reflecting surfaces that are at an angle to the nominal surface of the reflector. Each of these reflectors is an angular reflector inasmuch as each is a reflecting sheet that reflects light at an angle to a specularly reflected ray from the nominal surface.

These tiny rounded or flat sub-reflecting surfaces may be heterogeneously oriented, as in aluminum particles in paint (see FIG. 4c, U.S. Pat. No. 4,178,181), or may be orderly and repetitous as to slope, position, and curvature, when seen in a cross section of the reflecting surface (see FIG. 4a and 4b, U.S. Pat. No. 4,178,181)

It would be expected that certain shape and arrangement configurations would be better than others from functional considerations and from ease of fabrication considerations. There is a large number of configurations that would be described as being "angular reflectors."

Heterogeneous Reflector Advantages. (The surfaces of the sub-reflectors are heterogeneously oriented.) The advantage is that it produces a photograph that is easy to view with respect to the positioning of the light source, photograph, and eye. However, the brightness of the image is not very bright (as compared to a patterned reflector). An example of a heterogeneous reflector is to use paint, as described in U.S. Pat. No. 4,178,181 column 6 line 49 through column 7, line 2. This has been used by inventor successfully in making a photograph. Another heterogeneous reflector is the diffuse side of common household aluminum foil.

Patterned Reflector Advantages. The advantage is that it can produce a very bright image but the positioning of the light source, photograph, and eye can be very critical. By referring to U.S. Pat. No. 4,178,181, FIG. 4a, one can see a pattern in the sub-reflecting surfaces that is a repetition of alternating slopes and where the alternating slopes make essentially equal angles with the nominal surface of the reflector. FIG. 4b (of U.S. Pat. No. 4,178,181) suggests a repetition of alternating slopes where the alternating slopes make unequal angles with the nominal surface of the reflector. The inventor has used a reflector (shown in FIG. 7) made with equal alternating slopes where the alternating slopes make angles (with the nominal surface of the reflector) of 6 and 84 degrees; the 6 degree angle is shown at 709. This patterned reflector is of straight parallel grooves on a planar surface and the grooves 708 are spaced 0.001 inch apart; the reflecting surface is metal. It works. It was made by Fresnel Optics, 1300 Mt. Read Blvd., Rochester, N.Y. 14606.

Combination Reflector Advantages. A combination of a heterogeneous reflector and a patterned reflector has benefits. One that was tried was where (the above described) grooved reflector was of plastic (acrylic or Plexiglas) that had an aluminized reflecting surface (by vacuum deposition). The result was a reflector in which one could see one's own image, except at an angle to the perpendicular to the general plane of the reflector. (In ordinary specular reflectors or mirrors, one can, of course, see one's own image except it is perpendicular to the general plane of the reflector.) A solvent for the plastic (chlorobenzene) was allowed to come into contact with the reflector, with the result that the small angled reflecting surfaces were degraded, so that the reflections therefrom became slightly diffused. The length of time in the solvent determines the degree of degradation. Alternately, the reflector could have been made by degrading the groove surfaces first with solvent, and then aluminizing them. The result was that the reflection from the image was still very bright but the positioning of the light source, photograph, and eye was less critical than before.

Flexibility of Photographs Made Possible by Using Angular Reflector During Exposure The invention (of using an angular reflector during exposure) makes Lippmann type photographs possible that are flexible. The inflexibility of the Lippmann photograph-wedge combination, of prior art, was a consequence of the necessity of using the wedge. The wedge was necessitated as a consequence of the properties of the photograph, due to the reflector that was used during exposure; it was a non-angular reflector. It was a single, plane, specularly reflecting surface.

The invention changes the nature of the reflector used during exposure from a non-angular reflector that was a single, plane, specularly reflecting surface, to an angular reflector that is a reflecting sheet that reflects light at an angle to a specularly reflected ray from the nominal surface. An angular reflector is provided by a multiplicity of tiny sub-reflecting surfaces that are rounded bumps, flat or irregular surfaces, or are paint particles; their surfaces are angled with respect to the nominal reflecting surface. See U.S. Pat. No. 4,178,181 column 6, line 38 through column 7, line 2, and FIGS. 4a, 4b, and 4c. Also, column 3, lines 12–19 are of interest. The nature of the photograph that resulted was changed so that an inflexible wedge was no longer necessitated and a flexible photograph (as made on thin flexible film instead of glass plate) was made possible. Thus, the use of an angled reflector is a means of facilitating the making of a flexible Lippmann type photograph.

As known by inventor, viewable, Lippmann type photographs that were flexible did not exist prior to 1966.

With the invention, viewable, thin, light weight, flexible, Lippmann type photographs suitable for mounting in a conventional photograph album can be, and have been, made by the inventor. The images are more easily seen when the positioning of the illumination source, the viewer, and the photograph is optimized.

Ways of Making Angular Reflectors.

Angular reflectors can be made in a variety of ways.

Metallic Paint.

Figure 11:
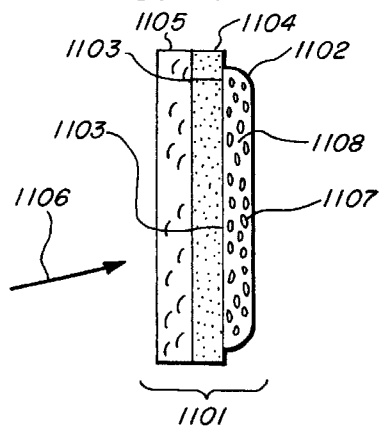
FIG. 11 is a cross section of an angular reflector of metallic paint.
Figure 12:
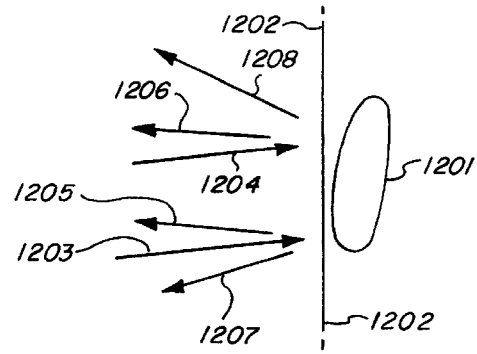
FIG. 12 is an enlargement of a portion of FIG. 11.

One way that an angular reflector can be made is by the use of metal powder in a paint, as by using aluminum powder. The aluminum paint may be applied to the surface of the photo-sensitive layer. The paint layer is an angular reflector because it satisfies the definition of an angular reflector; the paint layer is a reflecting sheet that reflects light at a variety of angles to a specularly reflected ray from the nominal surface. The paint layer is a sheet; it is of many sub-reflectors; the surfaces of the metallic aluminum particles in the paint are many sub-reflectors and most of the reflecting surfaces of the sub-reflectors are at an angle to the nominal surface. FIG. 11 shows a photo-sensitive element 1101, the angular reflector 1102, the nominal surface 1103, the photo-sensitive layer (emulsion layer) 1104, the photo-sensitive layer support 1105, a ray of exposing light 1106, the many sub-reflectors 1107 (metallic pigment particles), and the transparent vehicle 1108. The surfaces of the sub-reflectors (paint particles) that are of importance in reflecting light are the surfaces of said sub-reflectors that are toward the nominal surface; only the ones closest to the nominal surface are effective because they cast a shadow on the surfaces farther away from the nominal surface. FIG. 12 shows an enlargement of a portion of FIG. 11 and shows one paint particle 1201, the nominal surface 1202 (the vehicle is not shown), an exposing ray 1203, the specularly reflected ray 1205 from the nominal surface 1202, and the reflected light 1207; it can be seen that reflected light 1207 is at an angle to the specularly reflected ray 1205. Similarly, it can be seen that exposing ray 1204 results in a specularly reflected ray 1206 from the nominal surface 1202, and that part of the exposing ray penetrates the nominal surface 1202, strikes the paint particle 1201 and is reflected thereby resulting in ray 1208 which is at an angle to the specularly reflected ray 1206. An angular reflector in the form of a paint is shown in U.S. Pat. No. 4,178,181, FIG. 4c.

Foil.

Another angular reflector can be made by the use of a foil or a deformed metal surface where its surface is formed into a multiplicity of reflecting surfaces. Tiny rounded bumps, or flat or irregular shapes can form the sub-reflecting surfaces. Angular reflectors in the form of a foil with various shapes of sub-reflectors is shown in U.S. Pat. No. 4,178,181, FIGS. 4a and 4b. These reflectors are angular reflectors because each satisfies the definition of an angular reflector. The pattern sheets used in metal etchings may also be used as angular reflectors.; they are angular reflectors because they satisfy the definition of an angular reflector. There are many types of angular reflecting surfaces present on metal etching sheet #T55, supplied by Dufex Prints, F. J. Warren, Ltd., Hitchin Herts, England. This company can make entire sheets of the patterns shown on Sheet #T55 or on other patterned sheets they supply as T23, T25, T26, T27, T30, T31, T39, T40, T41, T51, T52, T55, also Ref. Numbers 183,770 Product code 80342, and Ref. Numbers 200,033, 200,067, 200,066 and others. Lenticular Sheeting, as once supplied by Edmund Scientific Co. of Barrington, New Jersey can also be used as an angular reflector provided the surface that is patterned is metallized; one side of the sheet is flat and the other is bumpy with very small lenses. The bumpy side is aluminized and the resulting angular reflector may be used with either side toward the photo-sensitive layer, although the bumpy side toward the photo-sensitive layer is the preferred orientation.

Sub-Reflectors Curved in Shape.

Figure 13:
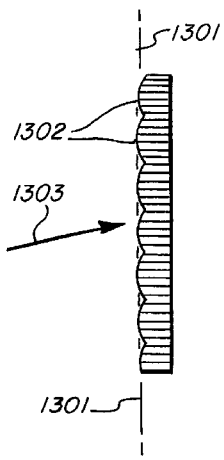
FIG. 13 is a cross section of an angular reflector of many sub-reflectors curved in shape.

The reflector resulting from many sub-reflectors curved in shape is an angular reflector because it fits the definition of an angular reflector. FIG. 13 shows the nominal surface 1301 of a reflector with sub-reflectors 1302 that are rounded in shape. The direction of the light to be reflected is shown at 1303.

Sub-Reflectors Flat in Shape. Irregular in Slope.

Figure 14:
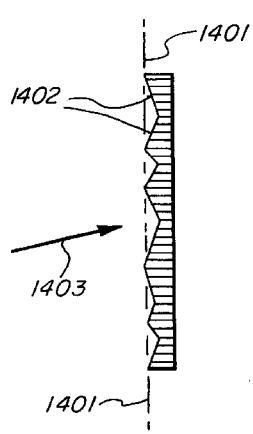
FIG. 14 is a cross section of an angular reflector of many sub-reflectors flat in shape and with irregular slopes.

The reflector resulting from many sub-reflectors flat in shape and with irregular slopes is an angular reflector because it fits the definition of an angular reflector. FIG. 14 shows the nominal surface 1401 of a reflector with sub-reflectors 1402 flat in shape and with irregular slopes. The direction of the light to be reflected is shown at 1403.

Sub-Reflectors Flat in Shape. Regular in Slope.

Figure 15:
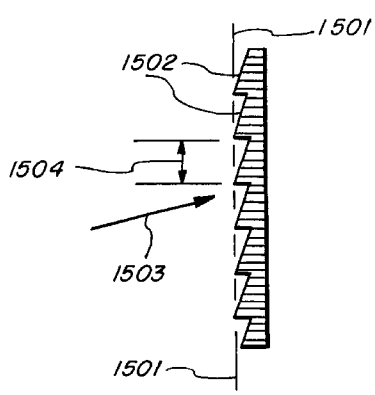
FIG. 15 is a cross section of an angular reflector of many sub-reflectors flat in shape and with regular slopes.

The reflector resulting from many sub-reflectors flat in shape and with regular slopes is an angular reflector because it fits the definition of an angular reflector. FIG. 15 shows the nominal surface 1501 of a reflector with sub-reflectors 1502 flat in shape and with regular slopes. The direction of the light to be reflected is shown at 1503. The dimension 1504 may be 001 inch.

Characteristics of Different Shapes.

It is to be expected that certain shapes, sizes and slopes are to be more useful than others. The inventor has had a reflector of the description of FIG. 15 made by diamond machining and found it useful. The material of the reflecting surface is evaporated aluminum onto an acrylic base of the desired form. The many angular surfaces of the sub-reflectors form a patterned surface. The pattern is of straight parallel grooves across a nominal surface that is a reflector; it is essentially planar. The shapes of the sub-reflectors form a pattern across the nominal surface if a theme is repeated.

Straight Grooves.

Figure 16:
FIGS. 16, 17, 18, 19, and 20 are cross section of an angular reflector that are of parallel grooves of various shapes as indicated in the figures.
Figure 17:
Figure 18:

The pattern of FIG. 7, when physically made as above and used during exposure to expose the photo-sensitive element, produces a photograph with an image that is particularly bright. When the photograph is viewed by using the sun to illuminate the photograph, the reflection from the image is so bright that it is blinding (this is the reflection from the image, not the reflection from the surface of the photograph). At the same time, the position of the viewer, photograph, and light source (sun) are very critical; either the reflection from the image is too bright, or the image cannot be seen at all. In order to make the viewing less critical, and at the same time retain a degree of brightness, one factor may be traded off for another. The image may be made less bright, but the viewing angle range may be increased. This can be accomplished by rounding the sub-reflector's angled surface 702 of FIG. 7 so that patterns indicated by FIG. 16 or 17 result. The pattern of FIG. 18 can also be used. The design of FIG. 16 is preferred.

Figure 19:
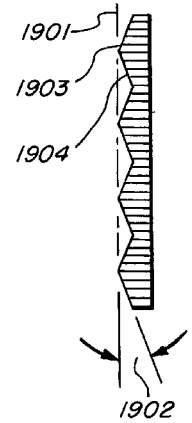

Another reflector of interest, which has straight parallel grooves across a planar surface, is shown in FIG. 19 which shows the nominal surface 1901 and sub-reflecting surfaces 1903 and 1904 which alternately slope in different directions; they may make angles 1902 of 30 degrees with the nominal surface 1901. They may also make angles of 10 or 20 degrees (etc) with the nominal surface 1901. In many applications, angles of no more than 20 degrees (for angle 1902) are desirable. In other applications, angles of 30 degrees are desirable.

Figure 20:
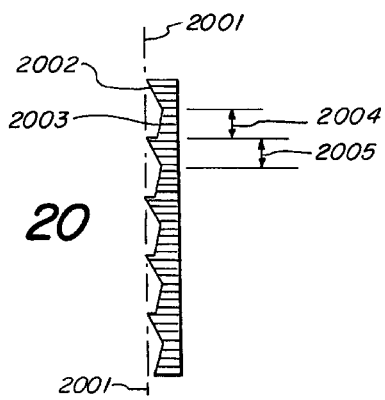

Another reflector of utility, which has straight parallel grooves across a planar surface, is shown in FIG. 20 which shows the nominal surface 2001 and sub-reflecting surfaces 2002 and 2003. The pattern is repeated. Sub-reflecting surfaces 2003 may be (and may not be) parallel to the nominal surface 2001 but surfaces 2002 are at an angle to the nominal surface 2001. The projected distance of the steeper sub-reflecting surfaces 2002 is 2005. The projected distance of the less steep sub-reflecting surfaces 2003 is 2004. The ratio of the projected distances 2004 and 2005 can vary from 1 to 100 or 100 to 1. However, the best mode contemplated by inventor is a ratio of 1 to 1. When the surfaces 2003 are parallel to the nominal surface 2001, this reflector can be considered to be a composite of an angular reflector (made up of all angular components 2002) and a non-angular reflector (made up of all non-angular components 2003).

Diffraction Grating.

Figure 21:
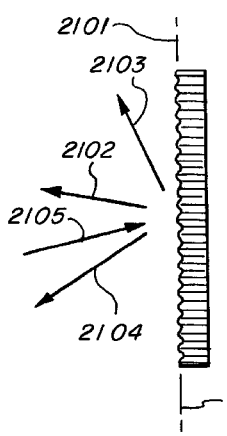
FIG. 21 is a cross section of an angular reflector which is a diffraction grating.

A diffraction grating, of straight (or curved) parallel grooves, is another form of an angular reflector, and is of utility. There are 3 diffraction grating types that are of particular interest. In the first, the grating should be made so that the positive first order is maximized; all other orders are suppressed. In the second, the grating should be made so that the positive first order and the zero order are maximized (they should be about equal). In the third, the grating should be made so that the positive and negative first order spectra are maximized and all other are suppressed. The preferred direction of the grooves is vertical (as opposed to horizontal) when used in a camera. There are on the order of 25,000 lines per inch or the line spacing is on the order of 0.000,040 inch. FIG. 21 depicts a diffraction grating where the nominal surface 2101, zero order reflection (specular reflection from the nominal surface) 2102, first order positive spectra 2103 the first order negative spectra 2104, and the incident ray 2105 are shown. In FIG. 21 it can be seen that reflected light 2103 and 2104 is at an angle to the specularly reflected ray 2102 from the nominal surface 2101.

Diffraction and Reflection Compared.

The groove spacing of FIGS. 7, 8, 13, 15, 16, 17, 18, 19, and 20, can vary between 0.010 and 0.0002 inch, for common photographic work, and the primary cause of the reflection is by reflection (rather than by diffraction and refraction) from the surfaces of the sub-reflectors. The preferred spacing is 0.001 inch. A company that can make this type of reflector is the Fresnel Co. of Rochester, N.Y.

The groove spacing of the diffraction gratings shown in FIG. 21 can vary between 0.000,2 to 0.000,010 inch, for common photographic work, and the primary cause of the reflections 2103 and 2104 is by diffraction and refraction (rather than by reflection) from the sub-reflectors, which in this case are grooves. The preferred spacing is 0.000,040 inch. Diffraction grating sheeting that can be used for this purpose is available from Steve McGrew, Light Impressions, Inc., in Ben Lomand, Calif.

Mosaics.

Figure 22:
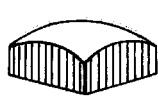
FIGS. 22, 23, 24, and 25 are sub-reflectors that form a mosaic over a sheet forming an angular reflector; their shapes are as shown in the figures.
Figure 23:
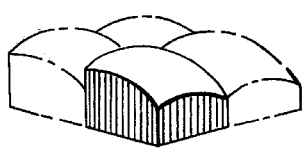
Figure 24:
Figure 25:

The sub-reflectors may form a mosaic over the reflecting sheet. The reflecting sheet may be covered with individual pieces, or sub-reflectors, which make up the mosaic, that are outlined in a square or rectangular shape. They may also be outlined in a hexagonal shape as used in foundation for the wax honeycombs of honey bees. Other shapes or purposeful designs are also possible. The size of the individual mosaic pieces, (or sub-reflectors) as used in ordinary photography, is 0.020 to 0.0002 inch across, with 0.002 inch across as the preferred size, although from cost considerations, larger mosaic pieces (or sub-reflectors) may be more desirable. The curved surfaces of the sub-reflectors are polished for high reflectance. Usually, the entire reflecting surface is covered with thousands of identically shaped individual pieces, and if they have an orientation, they are oriented in the same direction. Some of the sub-reflector (or individual mosaic) designs that are possible are shown in FIGS. 22, 23, 24, and 25. FIG. 22 is described as a pillow design, or convex surface. FIG. 23 is described as a tilted pillow design, or tilted convex surface. FIG. 24 is described as a concave surface design. FIG. 25 is described as a tilted concave surface design. The preferred design is shown in FIG. 23, the tilted convex design.

Size of Sub-Reflectors.

The outline of the sub-reflectors can be visible in the completed photograph. Thus, the size of the sub-reflectors should be small enough to be not resolved by the eye when viewing the photograph. In selecting the size of the sub-reflectors, one must consider the distance from which the photograph will be viewed and the fineness or the coarseness of the detail in the subject photographed. For example, if the subject being photographed is a large red dot on a black wall, sub-reflectors that are quite large may be very adequate, assuming the prime point of interest is the presence or absence of the red dot in the photograph. If, however, the subject being photographed is a web being spun by a spider, sub-reflectors that are quite small are required. Thus, the sub-reflector size should be small compared to the detail of the image in the photograph.

Benefits of Angular over Non-Angular Reflectors

An advantage that results from using angular reflectors during exposure, instead of using non-angular reflectors during exposure, is that it is much easier to see the image in the interference photograph that results. Prior art required that a wedge of glass be attached to the surface of the completed Lippmann photograph in order to make the image easily. With this wedge attached, it was impossible to make a thin Lippmann photograph that was light in weight and thin enough to be flexible. By the use of the reflectors shown and suggested by the above, during exposure, photographs result that are suitable for placing in a photograph album that are thin, light weight, and flexible.

Firsts of the 1966 Patent Application

The invention provides following results, as far as is known by the inventor:

1. The first practical way to make a viewable Lippmann type photograph where the image of the photograph can be easily viewed without a thick, heavy wedge being attached. This is a consequence of using an angular reflector during exposure. Prior art used a non-angular reflector during exposure.
2. The first practical way to make a viewable Lippmann type photograph where the photograph is thin enough and flexible enough that it can be mounted in a conventional photograph album. This, too, is a consequence of using an angular reflector during exposure. Prior art used a non-angular reflector during exposure.
3. From a historical position, U.S. Pat. No. 4,178,181 gives the first statement in the literature that specifies the use of flat, photo-sensitive grains as a means of increasing the sensitivity of any photo-sensitive element.

The inventor believes that photographic film made with flat, photo-sensitive grains, according to the specification, and used in interference photography (Lippmann type photography) possesses sensitivity and other advantages that are so beneficial that the use of the film in ordinary photography would be automatically considered by a person skilled in the art. Flat grains are not new. Several references have to do with making flat grains and give details as to size and thickness; none of them suggest utilizing grains of about 50 nanometers or less in thickness nor do they suggest any benefit in doing so. However, once the benefits of using grains of about 50 nanometers or less has been revealed, as has the inventor in the 1966 application, a person skilled in the art can use the information in the prior art references for obtaining the grains of the desired dimensions by extension of the techniques that were used by prior workers in making flat grains.

A DISCOVERY THAT MAKES 3-D PHOTOGRAPHS POSSIBLE

There has been discovered a certain kind of angular reflector that has been used in place of the non-angular reflector that Lippmann used. The Lippmann process of color photography results in 2-dimensional photographs. With the use of a certain kind of angular reflector in place of the non-angular reflector of the Lippmann process, a new process of color photography results. The result of the new process is that 3-dimensional colored photographs result. A certain kind of angular reflector has been discovered that results in a 3-dimensional photograph; it is a reflector covered with retro-reflecting elements.

A Comparison of 2-D and 3-D Photographs.

A comparison of 2-dimensional photographs and 3-dimensional photographs is of interest. The image carrying (emulsion) layer of both is as thin or thinner than a common sheet of newspaper. When a 2-dimensional photograph is viewed, the image appears on the 2-dimensional plane of the photograph. When a 3-dimensional photograph is viewed, the image can appear in front of, on, or behind, the 2-dimensional plane of the photograph by some distance, as many inches.

Definition of a Retro-Reflecting Element

Figure 26:
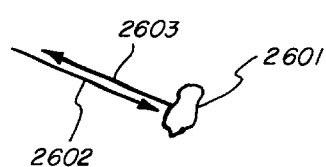
FIG. 26 shows a retro-reflecting element.

A retro-reflecting element is defined as a mass of material that has the property of returning an incident ray of light essentially along the incident light path, but in the opposite direction. (Their paths are parallel, and in opposite directions, but may be offset slightly from one another.) FIG. 26 shows a retro-reflecting element 2601, with the incident light ray 2602, and the reflected light ray 2603 that is along the incident light path, but in the opposite direction.

Definition of a Retro-Reflecting Sheet

A retro-reflecting sheet is defined as a sheet of material that has the property of returning an incident ray of light essentially along the incident light path, but in the opposite direction; the incident ray of light may fall anywhere on the surface and at any angle from 0 to 90 degrees from the perpendicular to the surface. The retro-reflecting sheet may be made up of retro-reflecting elements. If the light beam from a flashlight is directed to any position on this sheet, and at any angle, the light beam is reflected back to the flashlight.

Differences between a Retro-Reflecting Sheet and a Common Reflector Make 3-D Photographs Possible It is this property (of reflecting light back on itself) of a retro-reflecting sheet (or layer) that makes the 3-dimensional process work the same things that were just said about a retro-reflecting sheet cannot be said about an ordinary reflecting surface, as provided by a common household mirror or the mirror formed by a layer of mercury against the specular surface of glass (which is a specular surface) or the specular surface of the emulsion layer of a photo-sensitive element. In other words, if we now consider a common household mirror, and the beam of a flashlight is directed to any position on this surface, and from any angle, the light beam is not reflected back to the flashlight (except in the trivial case when the flashlight beam is perpendicular to the plane of the mirror). It is the property of a retro-reflector to reflect light in a desirably different way than light is reflected from an ordinary mirror that enables it to produce a 3-dimensional photograph.

Kinds of Retro-Reflecting Elements

What kind of things form a retro-reflecting element? A crystal of lithium niobate is a retro-reflecting element. A crystal of barium titanate is a retro-reflecting element. A clear glass bead reflector is a retro-reflecting element. A cube-corner reflector is a retro-reflecting element.

Lithium Niobate. Barium Titanate.

A sheet or flat section of a crystal of lithium niobate (or the like, as barium titanate) can form a layer or a mosaic of many pieces can form a layer. Flat pieces of such a crystal can be formed by sawing, cleaving, or by making thin sections of the material by the process by which thin sections of mineral specimens are made for petrographic studies.

Glass Beads.

Glass beads are perhaps the most common kind of retro-reflecting elements and are used extensively for road markers in lane dividing paints and reflective signs that light-up when the headlights of an automobile shine on them at night. Sheeting with glass beads covering the surface is manufactured by the 3M Company under the trademark "Scotchlight®".

Cube Corners

An example of a cube-corner reflector is an upper ceiling corner of a room where rectangular mirrors cover the three intersecting surfaces. The property of this reflector is that a person located anywhere in the room may look up into the corner and the person sees his face imaged in the corner. If a flashlight is directed into this corner from anywhere in the room, the light is reflected from this corner back to the flashlight.

Figure 27:
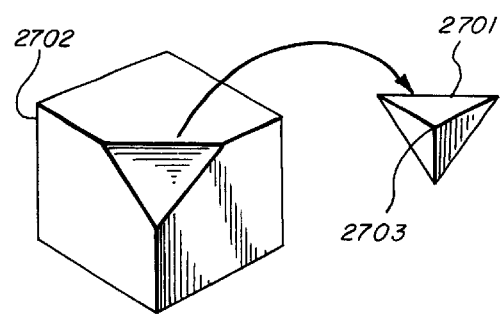
FIG. 27 shows a corner cube.
Figure 28:
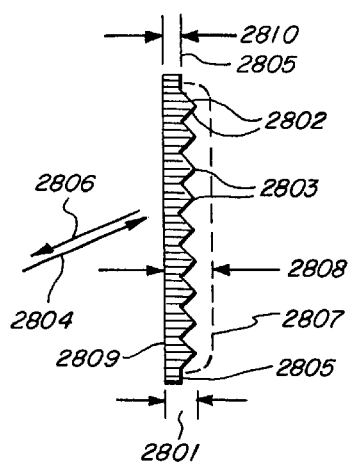
FIG. 28 shows a retro-reflecting sheet manufactured by the Reflexlite Corp.

FIG. 27 shows a cube-corner piece 2701 cut from a cubical box 2702. The point of the cube-corner is 2703. FIG. 28 shows a retro-reflecting sheet. A transparent sheet 2801 is shown with many cube-corners 2802 protruding. The cube-corners 2802 have the point of the corners indicated by 2803. The surfaces of the cube-corners 2802 may be metallized to provide desired reflectivity and are covered with protective paint 2807. When a ray of incident light 2804 is now directed anywhere on the nominal surface 2805, the incident light 2804 is reflected by the cube-corner reflectors 2802 essentially back along the same path as the incident light ray 2804; the reflected ray is 2806. Light is internally reflected by the surfaces of the cube corners 2802. The reflector is made up of sub-reflectors 2802.

Utilizing the properties of cube-corner reflectors, the Reflexlite Corp. of New Britain, Connecticut, makes retro-reflecting sheets of thin plastic where the cube-corner reflectors are very small; there are 47,000 corners per square inch. The cube corners are protrusions from the surface 2805. The Reflexlite material is used in applications similar to the applications found for sheets of glass beaded material, as produced by 3M. The Reflexlite material is depicted in FIG. 28. The thickness 2808 is about 0.010 inch, including the protective paint. The only retro-reflective sheeting that Reflexlite supplies is as shown in FIG. 28. In the applications for which the Reflexlite material is intended, the distance between the nominal surface 2805 and the reflecting surface 2809 is of no consequence. However, for this photographic application, as a retro-reflecting layer that is part of a photo-sensitive element, another consideration is of great importance. For this photographic application, it is desirable to have the corner cube sub-reflectors as close to the photo-sensitive layer as possible, or the distance 2810 should be a minimum.

An Improved Cube Corner Retro-Reflector Design

Figure 29:
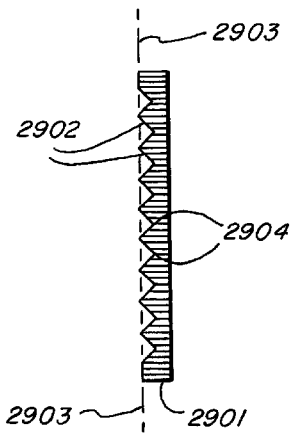
FIG. 29 shows an improved retro-reflecting sheet.

FIG. 29 shows an improved retro-reflector design that is better than the Reflexlite product, as shown in FIG. 28, for this photographic application. Here, the cube corner reflectors 2902 are depressions in the nominal surface 2903 of the improved retro-reflector 2901 that is toward the photo-sensitive layer. The points 2904 of the corner cubes are shown. The surfaces 2902 of the retro-reflector are metallized to enhance reflectivity. Protective paint is unnecessary as the cube corners are protected, being depressions rather than being protrusions as is the case for the Reflexlite material. Index matching material, as melted fructose, fills the depressions of the improved retro-reflector and can glue this reflector to the photo-sensitive layer of a photo-sensitive element.

Figure 30:
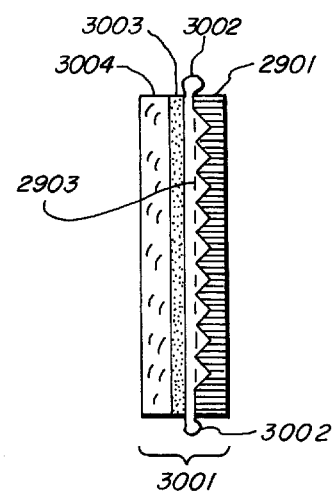
FIG. 30 shows the improved retro-reflecting sheet of FIG. 29 used as part of photo-sensitive element.

FIG. 30 shows this improved retro-reflector 2901 as part of a photo-sensitive element 3001. The index matching glue 3002, the photo-sensitive layer 3003, and the photo-sensitive layer support 3004 are also shown. The drawing shows substantial thickness of the index matching glue 3002 that is located between the nominal surface 2903 of the retro-reflector 2901 and the surface of the photo-sensitive layer 3003; in practice, this is minimized and is easily made less than 0.001 inch thick; no finite thickness is required. This works better than the Reflexlite product. Thus, its use facilitates the making of an improved retro-reflecting photo-sensitive element.

Figure 31:
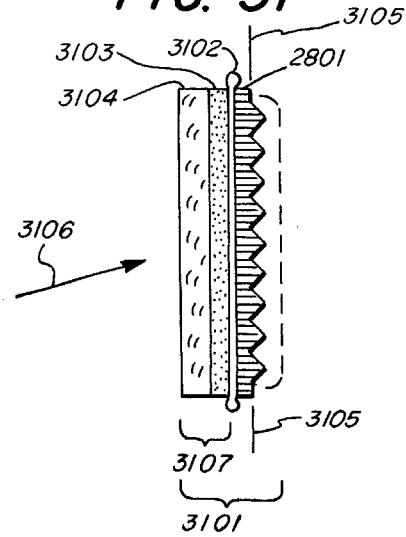
FIG. 31 shows the Reflexlite retro-reflecting sheet of FIG. 28 used as part of photo-sensitive element.

The advantages of the improved retro-reflector photo-sensitive element can be appreciated by reference to FIG. 31 which shows the Reflexlite retro-reflector 2801, as part of a photo-sensitive element 3101 being exposed to light 3106 from only one side of the element. The index matching glue 3202, the photo-sensitive layer 3103, and the photo-sensitive layer support 3104 are also shown. In contrast to the element 3001, the thickness between the nominal surface 3105 of the Reflexlite retro-reflector and the surface of the photo-sensitive layer 3103 cannot be made less than the thickness 2810 of FIG. 28 (which is 0.0075 inch thick) because this is the thickness of the available prior art material (element 2801) and prior art describes no advantage of making it thinner. Finite thickness of 2810 is required as this thickness is support for the cube corners 2802.

Tooling for the retro-reflector described above and shown in FIG. 29 can be made by Fresnel Optics, of Rochester, N.Y.

A Grooved Retro-Reflector

A second choice is available for the configuration of the retro-reflecting layer, and this is a "grooved retro-reflecting" layer. It is a somewhat common experience to encounter mirrors covering 2 walls that intersect in a corner of the room. When one looks into the corner from any place in the room, one sees one's own image, and the image is located at a position that is on the same level as the viewer's eyes (or is on a plane that is perpendicular to both mirrors, which intersect at right angles). A grooved retro-reflecting sheet (to be used as a layer of a retro-reflecting photo-sensitive element) can be made to accomplish a similar thing. Parallel grooves are made into a sheet and adjacent groove sides make 90 degree angles with one another. The 3-dimensional photograph that results has horizontal 3-dimensionality but not vertical 3-dimensionality.

Figure 32:
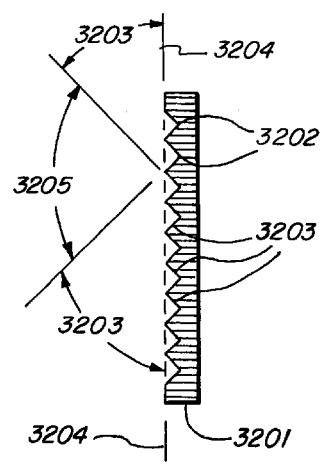
FIG. 32 shows a grooved retro-reflector.

This kind of grooved retro-reflector can be made to be used with the horizontally elongated lens of a photographic system used to take 3-dimensional photographs. The grooves could be made on 0.001 inch spacings. The preferred direction of the grooves is vertical when taking a picture of a person with the camera oriented in the common way. A company capable of making this kind of a reflector is Fresnel Optics of Rochester, N.Y. The system that results produces photographs that are horizontally 3-dimensional and does so with a camera that is efficient in both size and weight. FIG. 32 shows a grooved retro-reflector 3201 where the sides of the grooves 3202, which are planar, make equal angles 3203 with the nominal surface 3204. The angle 3205 is essentially 90 degrees.

Another angular reflector design of advantage is also adequately depicted by FIG. 32, but this time it is not a retro-reflector as the reflected ray is intentionally made to be at an angle to the incident ray. The purpose is to make illumination of the resulting photograph easier. The angle 3205 is purposely made larger or smaller than 90 degrees, but an angle larger than 90 degrees is preferred. Angle 3205 can vary between 90 and 112 degrees while keeping angles 3203 equal.

Prior Art: Scenery for Background Produced inStudio by Use of Retro-Reflecting Sheet.

The 3M glass beaded material has been used in a photographic application. This application is one of studio photography. It is used for producing background scenery from a slide projector. A wall behind the subject is covered with the retro-reflecting sheeting. A slide projector, aimed vertically at a beam splitter, projects a scene, that is to be the background, on the wall covered with the retro-reflecting material. A camera is aimed horizontally at the beam splitter and at the background scene that is reflected back to the beam splitter by the retro-reflecting sheet on the wall. The subject to be photographed is placed between the beam splitter and the wall covered by the retro-reflector. The subject is lighted by overhead lights. Because the light from the background is very bright due to the retro-reflecting sheet being a very good reflector and because the subject masks the retro-reflecting sheet, the photograph that results shows the subject surrounded by the desired background. This photographic use of retro-reflecting sheeting has nothing to do with a system that produces a photograph with a 3-dimensional image nor anything to do with a layered photo-sensitive element that includes a reflector as part of the photo-sensitive element. The photograph that is produced is in every sense a 2-dimensional photograph.

How to Make a Retro-Reflecting, Photo-Sensitive Element

A retro-reflecting photo-sensitive element can be made by glueing a sheet of suitable film and a retro-reflecting sheet together.

A sheet of 8E75 Agfa-Gevaert film is suitable. A retro-reflecting sheet of product designated as A/C 1000, or similar, available from Reflexlite Corp. of New Britain, Connecticut is suitable. The polycarbonate option is preferred over the acrylic option. A transparent, thermoplastic glue with an index of refraction of about 1.5 is desirable. It should be quite fluid at 180 degrees Fahrenheit (at least as mobile as honey at room temperature). A material that has been discovered for this purpose is fructose. A particularly outstanding property of fructose is that it is water soluble and flammable solvents are not necessary to use in clean-up nor removal after the element has been exposed.

In preparing the fructose, the crystalline material is heated to about 250 degrees F. and, with stirring, it soon becomes as liquid. It is then cooled to room temperature for future use. It remains clear, and quite hard.

The film, the retro-reflector, and the fructose is then placed in an oven set at 180 degrees F. The fluid fructose is placed between the retro-reflector and the emulsion side of the film. The layered assembly (film, glue, and retro-reflector) are placed between dark colored (as brown) blotting paper sheets and the whole cranked slowly through a clothes washer wringer that is operated by hand (this allows slow motion). This squeezes most of the excess glue from between the film and reflector.

(This same process can be used to make an improved Lippmann type photo-sensitive element where a specular reflector is wanted, but the toxicity and inconvenience of the liquid mercury is to be obviated. This can be brought about by utilizing metallized mylar or by the specular side of common household aluminum foil. Additionally, this same process can be utilized to make other non-Lippmann photo-sensitive elements where angular reflectors are used, as shown in U.S. Pat. No. 4,178,181, as described elsewhere in this disclosure, and as provided by the diffuse side of common household aluminum foil.)

The blotter adds some protection from light and at the same time absorbs the glue that is squeezed from between the film and reflector. This assembly is put through the wringer several times so that the glue layer is very thin. Then it is cooled to room temperature, the blotters removed, and the retro-reflecting photo-sensitive element (3-D film) cleaned up with a damp sponge. The 3-D film is ready for use. FIGS. 28 and 31 can be referred to where the 3-D film is 3101, the 8E75 film layer is the photo-sensitive layer 3103 combined with the photo-sensitive layer support 3104, the angular reflector is a retro-reflecting layer 2801 (and may include the protective paint 2807), and the glue layer is 3202. The preferred orientation of the 8E75 film is as shown in FIG. 31; the emulsion layer side 3103 is closer to the angular reflecting layer 2801 than is the emulsion layer support side 3104. The thickness of the 8E75 HD film (3103 plus 3104) was measured to be 0.0071 inch. The thickness of the retro-reflecting layer 2801 (including the protective paint layer 2807) was measured to be 0.0104 inch. The total thickness of the 3-D film 3101 (with the glue layer included) is estimated at less than 0.020 inch. It is quite flexible.

After exposure, the retro-reflecting, photo-sensitive element 3101 (3-D film) is again heated to 180 degrees, and the reflector peeled from the film. The film is cooled to room temperature. The film is then washed in room temperature water until the water soluble glue (fructose) is dissolved. Processing by any of a variety of procedures then follows.

Camera for Taking 3-D Photographs with Retro-Reflecting, Photo-Sensitive Element There is a difference in the technique and the camera that is used in ordinary photography, that produces a 2-dimensional photograph, and the technique and camera that is used in producing 3-dimensional photographs as herein described.

Commonly, in ordinary photography, one wants great depth of field and in order to obtain this desirable end, the effective lens diameter is made as small as possible so that the scene viewed by different areas of the lens is the same.

In 3-dimensional photography, as described herein, one wants small depth of field and in order to obtain this desirable end, the effective lens diameter is made as large as possible so that the scene viewed by different areas of the lens is different and on purpose. It is best for the F number to be 5 or less. In a digression, the size, weight, and cost of large lenses is a decided disadvantage. Fresnel lenses can be used to reduce weight and volume.

Human vision is such that subjects are seen 3-dimensionally in a horizontal direction only (or along a line that passes through both eyes). If a 3-dimensional photographic system is to preserve this capability of horizontal 3-dimensionality, and be willing to sacrifice the capability of vertical 3-dimensionality (which is provided by a round lens), the size and weight can be reduced substantially. Additionally, the inventor believes that by sacrificing vertical 3-dimensionality the horizontal 3-dimensionality is improved. An axial view of a large lens is shown in FIG. 33 that would be suitable for use in a camera with a 4×5 inch film (or plate) format. The lens 3301 is 3 inches in diameter and is capable of receiving more horizontal 3-dimensional information than human eyes, which are separated by about 2 ½ inches. The center positions of the left eye 3302 and right eye 3303 are shown.

In order to reduce the size and weight of the lens and to preserve the horizontal 3-dimensional information gathering ability, the lens could be made elongate in a horizontal direction and reduced in a vertical direction. To do this, the top 3304 and bottom 3305 of the lens is removed. A weight and size efficient lens for a photographic system, that is to produce 3-dimensional photographs, is produced; the shape is horizontally elongate. Thus, a camera design to facilitate the taking of 3-dimensional photographs is accomplished by the use of a lens that is horizontally elongate. Further weight and size reduction would be obtained by removing the center piece 3306. Prior art is stereoscopic cameras making stereoscopic paired photographs. The difference is that the 2 remaining lens pieces 3307 and 3308 have the same focal point whereas the 2 lenses of stereoscopic cameras have different focal points separated by the lens spacing. The images from 3307 and 3308 are on top of each other whereas the images from the 2 lenses of a stereo camera are separated by the lens separation. The space 3306 could be used for a between the lens finder, as is common to prior art stereo practice.

When the lens configuration used is horizontally elongated for the purpose of weight and size efficiency, a second choice is available for the configuration of the retro-reflecting layer. This is a grooved retro-reflector as shown in FIG. 32 and described in the specification that describes this figure. The system that results produces photographs that are horizontally 3-dimensional and does so with a camera that is efficient in both size and weight.

Preferred Glue

In order to glue the layers together, in layered photo-sensitive elements as shown in the disclosure, it was desired to obtain a glue with the following requirements:

1. It should be transparent.
2. It should have an index of refraction close to 1.5.
3. It should be thermoplastic.
4. It should be quite hard at room temperature, but not brittle.
5. It should be quite fluid at 180 degrees F. (as viscous as thick honey is at room temperature is adequate; even thinner is better).
6. It should be water soluble.
7. It should be non-toxic.

Substantial time was spent by the inventor in searching for materials that would meet the above specifications. No material was found.

Hence, an object of the invention is to find a material, meeting the above requirements, that would be especially useful as a way of temporarily glueing together the layers, in layered photo-sensitive elements, and additionally one that would be useful as an index matching material for optical applications in general.

An application is to obtain a layered photo-sensitive element that is assembled by the manufacturer and that may be taken apart easily by the end user by the utilization of heat. Additionally, water clean-up is most convenient, and it is desirable to have the residue easily removed by water rather than by solvents that are frequently flammable or toxic and water is usually available in photographic film processing laboratories.

There are resinous materials that meet the above specifications, except for the water solubility requirement.

The melting of dextrose and sucrose was tried. Sucrose was the worst as it was too viscous at 230 degrees F. and it turns brown. Dextrose was too viscous at 220 degrees. The melting of fructose was tried. When the temperature was raised to 250 degrees F. and stirred, it soon became liquid. When cooled to 180 degrees, it met requirement number 5 (above). Fructose is by far the least viscous (thinnest) at 180 degrees F. When cooled to room temperature, it met all the other requirements (above). At room temperature, the index of refraction was measured to be 1.523. Fructose can thus be used as a thermosetting optical cement. By adding some water (less than 20%), the material can be made more fluid at room temperature and at 180 degrees F.; the mixture, or solution, is one comprising fructose and water. It has been used successfully by the inventor in glueing together the layers of layered photo-sensitive elements. After exposing the element to light, the reflecting layer was peeled from the photo-sensitive layer after utilizing of heat.

Because the fructose glue is hygroscopic, photo-sensitive elements made with the fructose glue should be stored in a dry environment to retard the ingressing of moisture that can enter the glue layer around the edges. A small package of dessicant packed with the photo-sensitive elements is beneficial.

Thus, a useful, non-obvious material was found that meets the above 7 requirements for a material that is especially useful as a way of temporarily glueing together the layers of layered photo-sensitive elements. It is also useful as an index matching material for other optical applications.

The glue that results is stored at room temperature as a transparent semi-solid mass. Being hygroscopic, it is kept in closed containers.

Preferred Illumination Sources for Subject

The preferred illuminating sources for subjects being photographed, as in this disclosure, is by one, or more, monochromatic source. Sources for such light can be provided by lasers, gas discharge tubes, or white light sources (as from an incandescent source) filtered through narrow band filters.

The best mode is to use one or more monochromatic wavelengths as provided by one or more lasers.

However, in attempting to use a laser to evenly illuminate a subject, a coarse speckle pattern resulted.

Background for the speckle pattern follows. If one desires to start with a white light source in the form of a beam, as provided by a flashlight, and to evenly illuminate a wide area, it is merely necessary to aim the flashlight beam at a diffuse surface, as the diffuse side of common household aluminum foil; the reflected light reflected from the foil does provides even illumination over a wide area of the subject being photographed. The diffuse surface is a diffuser. If, however, one desires to start with a monochromatic light source in the form of a beam, as provided by a laser, and to evenly illuminate a wide area, and one aims the laser beam at a diffuse surface, as the diffuse side of common household aluminum foil, the reflected light from the diffuser does not provide even illumination over a wide area of the subject being photographed. Instead, a coarse speckle pattern results. When a photograph of a subject so illuminated is made, the unwanted speckle pattern shows up in the photograph. This is shown in FIG. 34 which shows the laser 3401, laser beam 3402, point of impact 3403, diffuser 3404, diffused light 3405, and the subject being illuminated 3406.

No easy nor obvious way was known to the inventor of eliminating the speckle pattern in a photograph that is produced by illuminating the subject with a laser light source. Invention was needed.

Hence, an object of the invention is to find a way of eliminating the speckle in a photograph that is produced by illuminating the subject with a laser light source.

It was discovered that by moving the diffuser during exposure (as with a motor) that the speckle pattern visually appeared to be of finer grain and that the pattern moved as the eye of the observer moved. The photograph that resulted (from using a laser with a moving diffuser) from the subject being illuminated this way showed no speckle pattern, even though it visually appeared that the subject was illuminated by a fine speckle pattern. Hence, the object of the invention was fulfilled; a way was found of eliminating the speckle in a photograph that is produced by illuminating the subject with a laser light source.

FIG. 35 shows the moving diffuser 3505, the laser 3501, laser beam 3502, point of impact 3503, moving diffuser motor drive 3504, diffused light 3506, and subject being illuminated 3507. Additionally, a lense 3508 may be placed in the laser beam 3502 to focus the laser beam to a point 3503 (smaller than the width of the laser beam) at the point of impact, thus providing a better point source of diffused monochromatic light than without the lens. Also, a lens (not shown) may be placed between the subject 3507 and diffuser 3505; when this is done, a convenient source of converging monochromatic light is available and may be focused to a remote point from which light diverges. This design is a reflecting diffuser as provided by the diffuse side common household aluminum foil. It is attached to a flat disc that is mounted perpendicularly to a rotating shaft. A rotational speed of the shaft of about 500 revolutions per minute has been found satisfactory and the distance from the point of impact to the axis of rotation is about 1 inch and the exposure time is about 1 minute. Other means of providing motion to a similar diffuser would be apparent to a person skilled in the art, as linear instead of rotary motion. In the design shown in FIG. 35, the diffused light is provided by way of reflection from a moving diffuser.

Diffused light may also be provided by transmission through a moving diffuser; a laser beam can be aimed (or focused with a lens) to a point on a ground glass surface and the diffused light that is transmitted through the ground glass is used to illuminate a subject being photographed. The ground glass is the moving diffuser. The ground glass may be a disc and motion may be imparted to it by a motor. Other ways of imparting motion to such a transparent diffuser would be apparent to a person skilled in the art.

Photographic Systems that Utilize the Retro-Reflecting Photo-Sensitive Element

When a retro-reflecting photo-sensitive element is properly exposed to light from a subject, processed, and illuminated, a 3-dimensional image of the subject is formed. The photographic system may or may not employ a focusing element.

Figure 37:
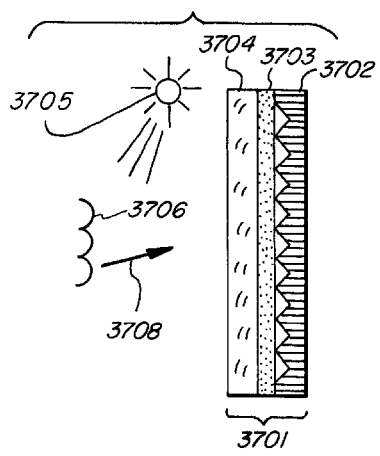
FIG. 37 shows a 3-dimensional photographic system that uses no lens.

A 3-dimensional photographic system that uses no lens or focusing element is shown in FIG. 37 which shows the layered photo-sensitive element 3701 (which is a retro-reflecting photo-sensitive element), retro-reflecting layer 3702, photo-sensitive layer (emulsion layer) 3703, emulsion layer support 3704, illumination source 3705 which illuminates the subject 3706 with light 3707 that is reflected from the subject 3706 along an incident light path 3708 to and through the photo-sensitive layer 3703 to the retro-reflective layer 3702 which reflects the incident light back along the incident light path 3708 as a reflected ray so that the incident and reflected rays coincide but travel in opposite directions. The incident and reflected rays interfere within the light-sensitive layer 3703 and interference patterns of light waves result which are parallel planes separated by a distance equal to ⅓rd of the wavelength (in air) of light present. The surface of the parallel planes is perpendicular to the incident and reflected light rays. For this process to work, the interference of light waves is required. Higher resolution is required for recording the interference patterns of short wave light than of long wave light. The photo-sensitive layer must not only be able to but must actually record these patterns. When more than one wavelength of light is present and is to be recorded, the photo-sensitive layer must be capable of and actually record the interference patterns caused by all the light present that one wants to record.

FIG. 37 shows a layered photo-sensitive element where one layer is a retro-reflecting layer and another layer is a photo-sensitive layer. FIG. 37 also shows the use of a retro-reflecting element as an essential element in a photographic system which produces a 3-dimensional photograph; here, the said retro-reflecting element is in the form of a sheet. FIG. 37 shows a method for making a 3-dimensional photograph where the subject is illuminated, and light from said subject exposes a "retro-reflecting photo-sensitive element."

Figure 38:
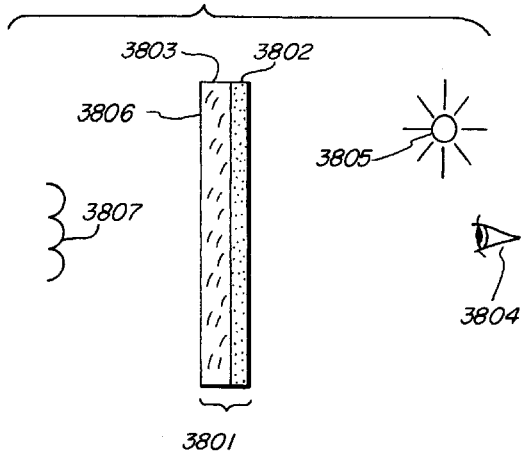
FIGS. 38, 39, 40, and 41 show ways of viewing a 3-dimensional photo-graph of the invention.
Figure 39:
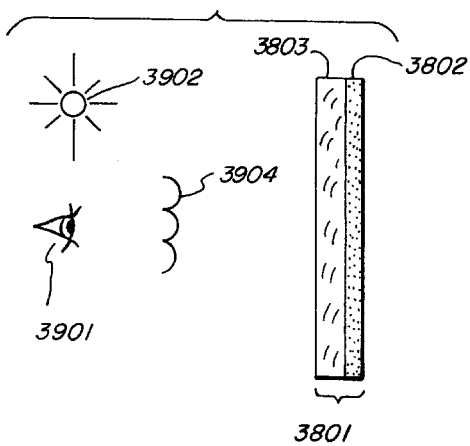

After exposure and processing, the photograph, which is a product of a lensless photographic system, is illuminated and the 3-dimensional image viewed. The viewing of the 3-dimensional image requires the interference of light waves. Viewing the 3-dimensional image of the photograph is shown in FIG. 38 which shows the photograph 3801, the emulsion layer 3802, the emulsion layer support 3803, the viewer 3804, the illumination source 3805 and black paint (the location of which is indicated by 3806 but is not shown in the drawing) which may be applied to the photograph on the side away from the viewer, here stated to be on the emulsion support layer 3803. The virtual image 3807 appears in 3 dimensions, as though it were behind the photograph, as the correct, positive, or orthoscopic image. The photograph may also be viewed from the other side as shown in FIG. 39 which shows the photograph 3801, the emulsion layer 3802, the emulsion layer support 3803, the viewer 3901, the illumination source 3902 and black paint 3903, which is indicated but not shown, which may be applied to the photograph on the side away from the viewer, this time on the emulsion layer. A real image 3904 appears in 3 dimensions, in front of the photograph, as the incorrect, reversed, or pseudoscopic image.

There are various ways that the photograph may be illuminated for viewing. The light may be diverging, parallel, or converging. The direction from which the photograph may be illuminated is either perpendicular to the surface of the photograph or at an angle between zero and 90 degrees. The quality of the light may be white or irregular across the spectrum. (The light of a gas discharge lamp, or light from a laser, are examples of an irregular sources.) The photograph may be viewed by any combination of the preceeding that would be apparent to one skilled in the art.

Figure 40:
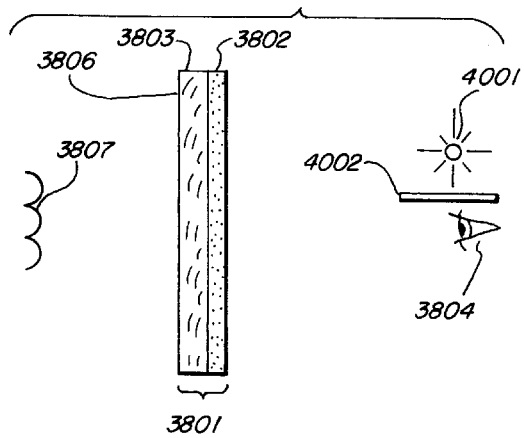

The preferred illumination condition is where a point source of white light is used and its position is close to the eye. (A "point source of white light" is provided by an incandescent light bulb with a small filament and clear glass envelope, as a 12 volt stop light from an automobile; this is in contrast to the white light provided by a frosted 100 watt light bulb.) This is shown in FIG. 40 which is similar to FIG. 38. FIG. 40 shows the photograph 3801, the viewing position 3804, and the virtual image 3807. The point source of diverging light 4001 is shown close to the eye 3804 and a shield 4002 is shown to ensure that only light reflected light from the photograph reaches the eye 3804.

Figure 41:
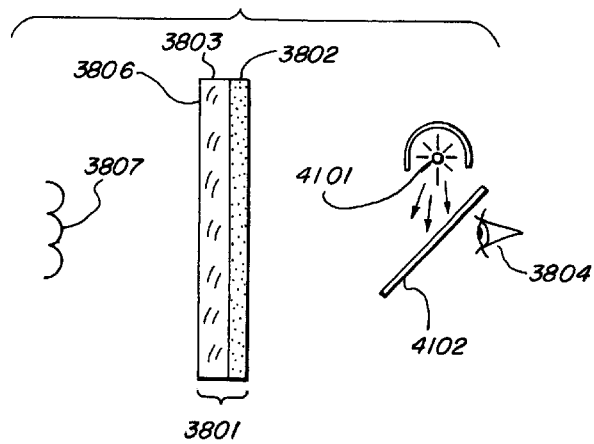

Another way of illuminating the photograph is from a point source of light positioned optically at the eye. This is shown in FIG. 41 which is similar to FIG. 38. FIG. 41 shows the photograph 3801, the viewing position 3804, and the virtual image 3807. A point source of diverging light 4101 is shown aimed at a beam splitter 4102 (which may be a pellicle) where light is reflected onto the photograph. The photograph is viewed through the beam splitter.

The methods of viewing the photograph (as above described) that result from using no lens may also be used to view a photograph that results from using focusing elements (as refractive or a reflective element) and next described.

A 3-dimensional photographic system that uses a lens as a focusing element is shown in FIG. 42 which shows the subject 3706, light source 3705, light 3707 traveling from the light source 3705 to illuminate the subject 3706, light reflected 3708 from the subject 3706 to the lens 4201 (refracting element), and the 3-dimensional image 4202 of the subject 3706. The retro-reflecting photo-sensitive element 3701 of FIG. 37 is placed at position 4203, 4204, or 4205 depending upon where the image is to appear in the photograph, as behind, on, or in front of the photograph. FIG. 42 shows, during exposure, a method for making a 3-dimensional photograph where the subject is illuminated, and light from said subject passes through at least one refractive element, and light from said subject exposes a "retro-reflecting photo-sensitive element." This photographic system, that uses a refractive lens as a focusing element for making a 3-dimensional photograph, is the preferred and best mode of practicing the invention; it is shown in FIG. 42.

A 3-dimensional photographic system that uses a reflector as a focusing element is shown in FIG. 43 which shows the subject 3706, light source 3705, light 3707 traveling from the light source 3705 to illuminate the subject 3706, light reflected 3708 from the subject 3706 to the reflector 4301 (reflecting element), and the 3-dimensional image 4302 of the subject 3706. The retro-reflective photo-sensitive element 3701 of FIG. 37 is placed at position 4303, 4304, or 4305 depending upon where the image is to appear in the photograph, as behind, on, or in front of the photograph. FIG. 43 shows, during exposure, a method for making a 3-dimensional photograph where the subject is illuminated, and light from said subject is reflected by at least one reflective element, and light from said subject exposes a "retro-reflecting photo-sensitive element."

These systems can be used to make a camera that takes colored 3-dimensional photographs by making an enclosure that comprises the lens and the retro-reflective photo-sensitive element, and a means for admitting light at will to make the exposure. This has been accomplished. It has been done by changing the nature of the reflector used in the Lippmann process of color photography. It employs the interference of light waves. During exposure, the distance between the camera and the subject can move more than a wavelength of light.

A 3-dimensional photographic system that converts a series of 2-dimensional cross sectional pictures of a 3-dimensional object into a single 3-dimensional photograph is depicted in FIG. 44. The principal of operation is that the photographic system that comprises the retro-reflecting photo-sensitive element is used and a single retro-reflecting photo-sensitive element is exposed by multiple exposures to the series of cross sectional pictures resulting in a single photograph that contains all of the information of the 5 cross sections correctly displayed in space. It is a 3-dimensional montage instead of the common 2-dimensional montage of artworks; each exposure is made with the image of each 2-dimensional cross section of the series located at a different distance from the retro-reflecting photo-sensitive element.

FIG. 44 shows the camera 4401, the retro-reflecting photo-sensitive element 4402, the lens 4403, and means 4404 for admitting light. An illumination source is shown at 4405. A series of pictures, 5 in this example, are x-ray cross sections of a football, as a CAT Scan; The x-rays are shown in plan view at 4416 through 4420. The outline of the football 4416 is added for visualization purposes; it is not actually there. There are different methods of positioning the images (4411–4415) of each of the cross sections (4416–4420) at different distances from the retro-reflecting photo-sensitive element 4402. One of the methods follows.

1. The first exposure is made with the first cross section 4416 located at the position indicated by 4406; the image to be recorded appears at 4411. The cross section of the football is a ring and the intersection of the ring with the plane of the paper is 2 dots as indicated by 4411. The 3-dimensional photograph, however, will show the entire ring positioned appropriately in space.
2. The second exposure is made with the second cross section 4417 located at the position indicated by 4407; the image to be recorded appears at 4412.
3. The third exposure is made with the third cross section 4418 located at the position indicated by 4408; the image to be recorded appears at 4413.
4. The forth exposure is made with the forth cross section 4419 located at the position indicated by 4409; the image to be recorded appears at 4414.
5. The fifth exposure is made with the fifth cross section 4420 located at the position indicated by 4410; the image to be recorded appears at 4415

When the photo-sensitive element is processed and viewed, the football will appear as a series of rings suspended in space. The rings represent the intersection of the 5 cross sections through the surface of the football, and in this case x-ray pictures. A choice of 5 cross sections is illustrative only, more or less than 5 can be used.

FIG. 44 depicts a way that cross sectional pictures may be photographed where the pictures may be opaque and they are illuminated by reflected light from light source 4405. The light that reaches the film 4402 was reflected from the pictures 4406–4410.

FIG. 44 depicts a 3-dimensional image that is about the same size as the cross-sectional pictures. The image may be made larger or smaller than the subject depending on the optics, relative positions of the cross sections, optical system, and retro-reflective photo-sensitive element.

Transparencies may be used instead of opaque pictures, so that light transmitted by the transparencies (the transparencies are back lighted) reaches the lens 4403 and the film 4402.

Instead of the cross sections 4406–4410 being pictures (which may be photographs), A video display terminal may provide a sequence of pictures that is photographed by the camera. One way of doing the is to position the video display screen first at position 4406, and the first exposure is made. Then the surface of the video display screen is relocated to position 4407, and the second exposure is made. This continues until all cross sections have been photographed by the camera 4401. The best mode of supplying light to the cross sections, whether the cross sections are pictures (opaque or transparent) or whether the cross sections are displayed on a video display terminal, is by monochromatic light. The video display terminal should use internally the trace a monochromatic light beam. One or more monochromatic light sources may be used in each application.

FIG. 44 shows the sequence of pictures being taken where each of the sequence is positioned at a different distance from the camera lens 4403. Another way that variable positioning of the cross sections may be affected is by leaving the distance to the cross sections the same for each picture but instead vary the conditions within the camera so that the image of each cross section falls at the desired distance (in front of, on, or behind) from the film 4402. As an example of when video information is being converted into a 3-dimensional image, it would probably be most convenient for the distance from the camera 4401 to the video screen to remain constant and to vary the camera optics to position each cross section (displayed on the video terminal) at the desired position with respect to the film 4402. However, another way of doing it would be to leave the distance from the lens to the video screen constant and to vary the position of the film 4402 for each exposure.

Another way of making a 3-dimensional image is to continually expose (leave the shutter 4404 open) as the subject moves in space (or as the video display terminal continually moves while the picture continually changes during the exposure). The 3-dimensional image in the photograph that results then displays a colored trail of the path of the light emitting subject during exposure. This would be analagous to the case in ordinary 2-dimensional photography when the lens is left open on a time exposure and traffic lights on a distant roadway are recorded as white and red streaks that record the positions of headlights and tail lights during the exposure, except in this case, the streaks are seen in 3-D.

The use of this method of converting 2-dimensional cross section images of 3-dimensional objects to a single 3-dimensional photograph has advantages over other methods of doing so. One of the main areas of application is to medical imaging.

The preferred embodiment is to use a photographic system that uses a refractive focusing element and a retro-reflective photo-sensitive element as the particular angular reflector, as shown in FIG. 42.

Some Details of the 3-Dimensional Process

The "retro-reflecting photo-sensitive" element:
1. The element is a layered assembly which includes (a) a light-sensitive (emulsion) layer, and (b) a parallel retro-reflecting layer
2. The retro-reflecting layer is an "angular" reflector because it is a reflecting sheet that reflects light at an angle to a specularly reflected ray from the nominal surface. This is discussed elsewhere in this specification; see FIG. 7.

3. The minimum thickness of the light-sensitive (emulsion) layer must be at least as thick as 2 planes (described elsewhere) for the process to work. The longer the wavelength, the farther apart the planes. Another way of saying the same thing is that the minimum thickness of the light-sensitive (emulsion) layer must be at least equal to the longest wavelength of light (in air) to be recorded divided by 3. Therefore, if wavelengths over the entire visible spectrum (400 to 700 nanometers) are to be recorded, the longest wavelength to be recorded is 700 nanometers, and the emulsion layer minimum thickness must be at least equal to 700 divided by 3 equals 233 nanometers; it could be 600, but not 150 nanometers thick.

The method of using the "retro-reflecting photo-sensitive" element includes the following essential steps during exposure:

4. The photo-sensitive element is exposed to light from only one side of the element. See FIG. 31.
5. The incident light and its reflection interfere, within the light-sensitive (emulsion) layer, causing an interference pattern of light waves to exist within the light-sensitive layer during exposure.
6. These patterns are a series of parallel planes of light (separated by planes of darkness). The planes are not parallel to the reflecting surface and assembly layers (except in the trivial case where an exposing ray is exactly perpendicular to the assembly layers) but are perpendicular to the exposing ray of incident light (within the emulsion); the distance apart is about ⅓rd of the wavelength (in air) of the light. The light-sensitive layer must be able to record these planes that are spaced as closely as ⅓rd of the shortest wavelength (in air) of the light to be recorded.
7. It is this angular orientation of the planes to the assembly layers that makes a 3-dimensional image possible. It is because of the non-angular orientation of the planes to the assembly layers in the Lippmann process that makes a 3-dimensional image not possible. In the Lippmann process, the planes are parallel to the assembly layers (they are non-angular). In the process of the invention, which uses a retro-reflecting layer, the planes are not-parallel to the assembly layers (they are angular).
8. During exposure, interference patterns (planes) produced by light waves are present within the light-sensitive layer. They are not parallel to the nominal surface of the reflector (except in the trivial case where an exposing ray is exactly perpendicular to the assembly layers). They are perpendicular to the exposing ray within the emulsion.
9. The light-sensitive layer is required to be able to record these interference patterns (planes).
10. The light-sensitive layer does record these interference patterns (planes). Or, the recording of the interference patterns of light waves within the light-sensitive layer takes place by exposing the light-sensitive layer.

The method of using the "retro-reflecting photo-sensitive" element includes the following essential steps after exposure:

11. The retro-reflecting layer is removed.
12. Detecting the image (or viewing the photograph) requires the interference of light waves.
13. Although surface relief may occur in the photograph, an element of the image is primarily manifested by reflection from partially reflecting, parallel planes within the emulsion layer of the photograph rather than from surface relief.

The Pyrochrome Process

This information has been supplied by Dr. Tung H. Jeong, Professor of Physics, Lake Forest College, Laker Forest, Ill., 60045. This is a process for processing holograms. The inventor has found it useful for processing photographs exposed with angular reflectors. Dr. Jeong's sheet is reproduced below.

Film and Plates for Making Holograms with HeNe Lasers

Holotest 8E75 HD film and plates can be used to make all types of holograms, and the processing procedure is the same. Expose the emulsion with approximately 200 ergs/$cm^2$. Experimentally, expose the hologram so that within less than one minute of development the hologram turns dark but not opaque (a density of 2.5 is best).

Processing Procedure: The "Pyrochrome" process.

1. Develop one minute in the prescription below:
    Solution A: pyrogallol -10 gm/liter.
    Solution B: sodium carbonate anhydrous -60 gm/l.

Mix equal parts of A and B just before use. It becomes bad after 10 minutes, so use only enough for the hologram being developed and dispose. The above mixture yields a red image for reflection holograms. If a color shift is desired (toward orange, yellow, or green), add from 0–25 gm/l of sodium sulfite to Solution A. (Pyrogallol is available at large chemical suppliers, like Fishers, American Scientific Products, Eastman Kodak, etc.)

2. Wash for 3 minutes.
3. Bleach until clear -15 seconds with maximum of 2 minutes. Bleach solution: Potassium dichromate -4 gm/l and 4 ml/l of concentrated sulphuric acid.
4. Wash for 3 minutes.
5. Wash in Kodak Photo Flo solution for 2 minutes.
6. Hang up vertically to dry. For plates, rest hologram vertrically on paper towels. Transmission holograms may be squeegeed.

Resolution Requirement of the Photo-Sensitive Layer Used with the Retro-Reflecting Layer Resolution of the photo-sensitive layer must be at least equal to the shortest wavelength (in air) to be recorded divided by 3.

If the shortest wavelength to be recorded is 400 nanometers (deep violet), the photo-sensitive layers must be able to resolve interference planes that are separated by 400/3=133 nanometers; this is in a direction parallel to an incident exposing ray. The interference planes are perpendicular to the exposing ray. Within the photo-sensitive layer, the exposing ray can be up to about 42 degrees off the perpendicular to the surface of the element when the index of refraction of the photo-sensitive layer is 1.5. In the case where deep violet is to be recorded (400 nanometers), the resolution requirement is 7,500 planes per millimeter. Had the wavelength of interest been 700 nanometers, the resolution requirement would have been 4,290 planes per millimeter. From these figures, it can be seen that the resolution requirement when a retro-reflecting layer is used (or for the Lippmann method of color photography) is much higher than for ordinary photography where a resolution of 200 lines per millimeter (in a direction parallel to the film surface) is considered high.

The photo-sensitive layer can be a silver halide emulsion layer. When these grains are spherical, as is the Lippmann process, their average diameter, is about ⅛th of the shortest wavelength of light to be recorded, or less, for adequate reproduction of color.

Although 8E75 HD film or plate (silver halide) has been stated in several places within this disclosure, a person skilled in the art would choose many other types of photo-sensitive materials for the photo-sensitive layer in a retro-reflecting photo-sensitive element for various applications and light sources. Among the other photo-sensitive materials is dichromated gelatin. These and other photo-sensitive materials suitable for various applications of the invention can be found in Collier, 1971; Wolf, 1983; Goodman, 1980; Smith, 1977; and Jeong, 1982.

BEST MODE

The best mode of making a retro-reflecting photo-sensitive element (3-D Film) is shown in FIG. 31 where the retro-reflecting layer 2801, photo-sensitive layer (emulsion) 3103, photo-sensitive layer support 3104 and the glue 3102 are shown. The retro-reflecting layer material can be obtained from Reflexlite Corp., 199 Whiting St., New Britain, CT 06050 and is designated as "A/C 1000, white, no adhesive." or "PC 1000 with Tyvek backing, white." The former is preferred but the latter is more available. The photo-sensitive layer 3103 and its support 3104 is Agfa-Gevaert 8E75HD film (or plate). The glue is fructose, made by heating granular fructose until it melts, and cooling to 180 degrees F. The 8E75HD and the retro-reflective layer are placed in an environment of 180 degrees F. The film is placed flat, the fructose poured over it, and the reflector placed on top, with the reflecting surface toward the emulsion surface. All but a thin film of glue is removed by slowly putting the assembly through rubber rollers (as hand operated clothes washing wringer). The assembly is cooled to room temperature and a damp sponge can be used to clean up excess glue from the surfaces.

The best mode for utilizing the 3-D Film is described under the heading "Exemplary Method of Using the Invention."

PERSON SKILLED IN THE ART

The specific industry or trade in which the practical manufacturing problems are encountered and in which the invention is used is the photographic film manufacturing industry. All of the above steps would be best performed by a photographic film manufacturing company, as Eastman Kodak Co., and sold to the public ready to use.

Different aspects of the invention involve distinct arts. The "person skilled in the art" is a team made up of experts skilled in the various aspects of the invention. An example of such a team of experts is shown in Mees, 1961, page viii.

BRIEF COMPARISON. PHOTOGRAPHS OF THE INVENTION AND PRIOR ART

Figure 46:
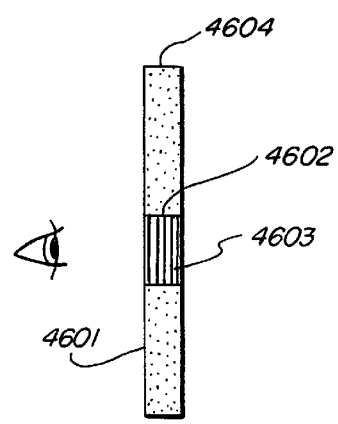
FIG. 46 shows an element of the image of a Lippmann photograph.
Figure 48:
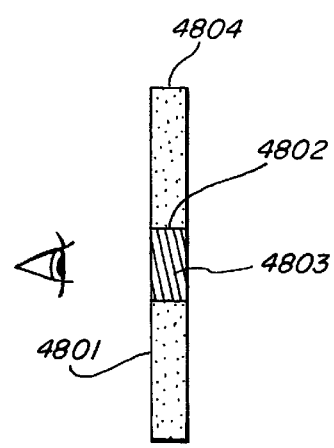
FIG. 48 shows an element of the image of the invention's photograph. OBJECTS OF THE INVENTION 1. An object of the invention is to find a way of improving the Lippmann process of color photography, which produces a photograph with a 2-dimensional image, to result in another process of color photography, which produces a photograph with a 3-dimensional image.

There is a difference in the photographs resulting from the Lippmann process and the process of the invention. FIG. 46 depicts the Lippmann photograph. FIG. 48 depicts the invention photograph.

The difference in the resulting photographs is depicted by the partially reflecting parallel planes of the figures. The image in both photographs is composed of these parallel planes. However, the planes of the invention 4803 are at an angular relationship to the photograph's surface 4801, whereas the planes of the Lippmann process (prior art) 4603 are at a non-angular relationship to the photograph's surface 4601 (as the planes are parallel to the photograph's surface). It is this angular relationship of the planes 4803 that makes the 3-dimensional imaging of the photo-sensitive element of the invention possible.

Figure 1:
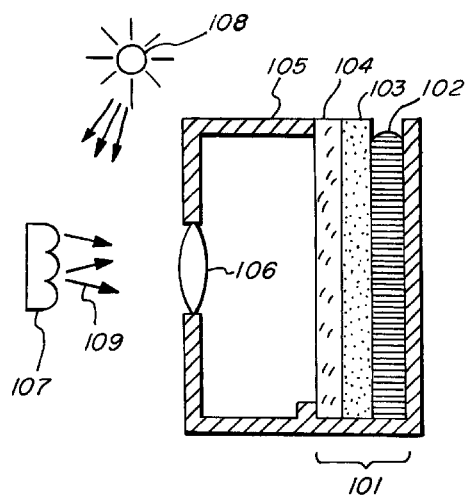
FIG. 1 is a cross-section of a Lippmann light-sensitive element.

The invention's retro-reflecting photo-sensitive element 3101 of FIG. 31 may be compared to the prior art Lippmann photo-sensitive element 101 of FIG. 1.

Additionally, a comparison can be made by referring to FIGS. 45, 46, 47, & 48.

Figure 45:
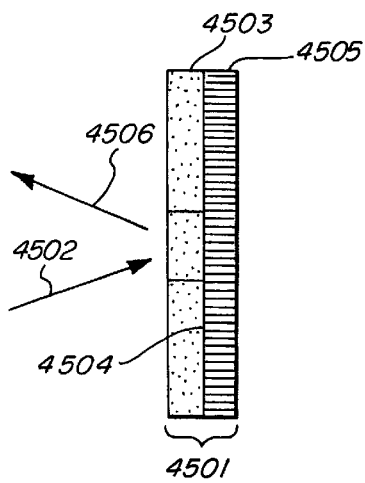
FIG. 45 shows the Lippmann photo-sensitive element and reflections.

Essentials of the Lippmann photo-sensitive element are shown in FIG. 45; the photograph that results is shown in FIG. 46.

Figure 47:
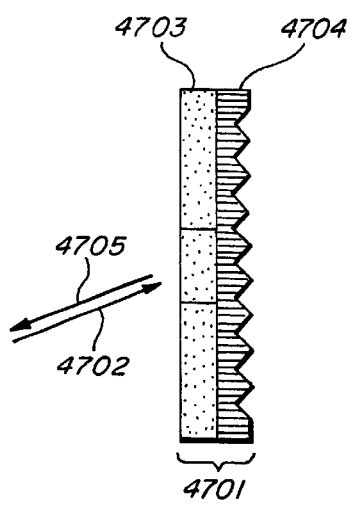
FIG. 47 shows the retro-reflecting photo-sensitive element of the invention and reflections.

Essentials of the invention's retro-reflecting photo-sensitive element are shown in FIG. 47; the photograph that results is shown in FIG. 48.

The Lippmann Photo-Sensitive Element.

When an exposing ray enters a Lippmann photo-sensitive element, it is reflected as shown in FIG. 45. FIG. 45 shows the Lippmann photo-sensitive element 4501. The incident light ray 4502 passes through the photo-sensitive layer 4503, and is reflected by the surface 4504 of the ordinary (specular) reflector 4505 (of mercury) as the reflected ray 4506.

An element of the image 4602, in the resulting photograph FIG. 46, is formed by partially reflecting planes 4603, within the emulsion layer 4604, that are parallel to the surface of the photograph 4601 as shown in FIG. 46.

The Retro-Reflecting Photo-Sensitive Element.

When an exposing ray enters a retro-reflecting photo-sensitive element, it is reflected as shown in FIG. 47. FIG. 47 shows the retro-reflecting photo-sensitive element 4701. The incident light ray 4702 passes through the photo-sensitive layer 4703 and is reflected by the retro-reflector 4704 as the reflected ray 4705.

An element of the image 4802 in the resulting photograph FIG. 48 is formed by partially reflecting planes 4803, within the emulsion layer 4804, that are at an angle to the surface of the photograph 4801 as shown in FIG. 48.

It is the ability (of the retro-reflecting photo-sensitive element of the invention) to form (in the completed photograph) partially reflecting layers that are at a particular angle to the surface of the resulting photograph that is responsible for the invention producing 3-dimensional photographs.

Non-Angular and Angular Reflectors in Making 3-Dimensional Photographs

Inventor believes that angular reflecting surfaces within the emulsion layer of the completed photograph are required in order to produce a 3-dimensional image and that the use of an angular reflector during exposure is required to produce said angular reflecting surfaces within the emulsion layer of the completed photograph.

FIG. 46 shows a completed photograph with non-angular reflecting surfaces within the emulsion layer that result from using a non-angular reflector during exposure. They cannot produce a 3-dimensional photograph. A non-angular reflector was used by the prior art of Lippmann.

FIG. 48 shows a completed photograph with angular reflecting surfaces within the emulsion layer that result from using an angular reflector during exposure. They can produce a 3-dimensional photograph. An angular reflector was not used by the prior art of Lippmann. The first angular reflectors known to inventor are revealed in the application of 1966 that resulted in U.S. Pat. No. 4,178,181.

Some angular reflectors used during exposure do not result in 3-dimensional photographs.

Some angular reflectors used during exposure do result in 3-dimensional photographs. An example is a retro-reflector and inventor believes that there are other angular reflectors that also result in 3-dimensional photographs, although the retro-reflector (utilizing cube-corners formed by 3 intersecting surfaces) is the best mode for producing 3-dimensional photographs.

Exemplary Methods of Using the Invention.

The preferred method for making a 3-dimensional photograph is with the use of a lens, as shown in FIG. 42.

The focal length of the lens should be less than 5 times the lens diameter (the f number is less than 5).

A suitable camera is obtained. Guidelines are provided in the part of this disclosure that is entitled "Camera for taking 3-D photographs. One that has proved to be useful is a Speed Graphic with a 4×5 inch format. A lens, that can be used to advantage, has a diameter of 2.63 inches and has a focal length of about 3.25 inches. The distance of the lens 4201 to the film 4204 is made equal to the distance of the lens 4201 to the subject 3706 of FIG. 42

A method for making a 3-dimensional photograph comprises a sequence of the following steps of:

1. providing film that is a layered photo-sensitive element wherein one layer is a photo-sensitive layer and another layer is a retro-reflecting layer. This film is shown in FIG. 31 wherein the layered photo-sensitive element is shown at 3101 and one layer that is a photo-sensitive layer is shown at 3103; another layer that is the retro-reflecting layer is shown at 2801. The retro-reflecting layer 2801 is glued to the photo-sensitive layer 3103 by the glue shown at 3102. The photo-sensitive layer support is shown at 3104. The 8E75 film that is used is indicated by 3107. The thickness of the film indicated by 3101 of FIG. 31 is about 0.020 inches and quite flexible.

The directions on how to make this retro-reflecting, photo-sensitive element are given in the portion of this disclosure that is entitled "How to Make a Retro-Reflecting, Photo-Sensitive Element." A film or glass plate holder is convenient. The film 3101 (retro-reflecting, photo-sensitive element) is placed in the film holder and placed in the camera. A sheet that is less than 4×5 inches can be used and it can be held in place by attaching it to the partition that divides the film holder in two by the use of pressure sensitive tape.

2. illuminating the subject to be photographed. The set up is shown in FIG. 42 with the subject at 3706, the illumination source at 3705, the camera lens at 4201, and the film (retro-reflecting photo-sensitive element) at 4204. The preferred illumination source 3705 is diffused light from a laser in order to provide a monochromatic light source (See FIG. 34.). If one monochromatic source is used, the photograph will appear in one color only. If more colors are desired in the photograph, the subject needs to be lighted by a plurality of monochromatic light sources. As an example, a helium-neon laser can provide a red monochromatic light source with a wavelength of 633 nanometers and a argon laser can provide a blue monochromatic light source with a wavelength of 488 nanometers. Some lasers provide multiple monochromatic wavelengths and these can be selected for use at will. Gas discharge tubes (examples are mercury, sodium, or cadmium) also can provide one or more monochromatic wavelengths. By suitable filtering of sources that provide multiple monochromatic wavelengths, the wavelengths of choice can be obtained. Details of how diffused monochromatic light may be used in illuminating the subject are shown in the part of this disclosure that describes FIGS. 34 and 35. When the subject is illuminated with light from a helium-neon laser as suggested, the energy density falling on the subject can be made to equal about 3 micro-watts per square centimeter. If the subject is a polished coin, it can be oriented so that one of the more or less flat sides of the coin reflects light into the lens of the camera.

3. exposing the film (retro-reflecting, photo-sensitive element) with light from the subject. The exposure can be about 45 seconds.

4. removing the reflecting layer from the photo-sensitive element.

The film (photo-sensitive element) is removed from the camera and heated in an oven to about 180 degrees F. The retro-reflecting layer is then peeled away from the photo-sensitive layer and the photo-sensitive layer (with support) cooled to room temperature (as 72 degrees). The glue residue is removed by agitating the film in a container of running water until the glue is dissolved-away. The glue feels slick, and its presence can be felt by lightly rubbing the emulsion layer with a finger while it is being washed by water. Before processing, the image is invisible.

5. developing the photo-sensitive layer of the photo-sensitive element to provide a 3-dimensional photograph. The best way known to inventor for developing (or processing) is to use the "pyrochrome process." Processing makes the image visible. The details of this process are given under the heading, "The Pyrochrome Process". The inventor develops for 1 minute, water washes for 3 minutes, bleaches for 1 minute, water washes for 3 minutes or more minutes. This step may be followed by placing in Photo-flo solution for ½ minute. It is then dried. The image appears green (assuming that only one monochromatic light source was used to expose the film and that was at 633 nanometers). The color can be corrected by immersing the photograph in a solution of triethanolamine in water. This is discussed in Collier page 289. An incandescent light source is commonly used for viewing the photograph.

6. painting the side of the photograph away from the observer.

The side of the photograph away from the observer is painted black. This is because the photograph is transparent where there was no light in the subject. "No light" means blackness" and in order to make the photograph appear black in areas where it is transparent, black paint is used. The use of almost any black paint helps. A particular one that has been found to be especially useful is Ultra Black #1602 Krylon, manufactured by Borden, Inc., Columbus, Ohio 43215.

The film that was exposed in the camera forms the photograph and is a positive.

A method, for making a 3-dimensional photograph where the subject 3706 is illuminated 3707 and light 3708 from the subject 3706 passes through at least one refractive element 4201 and light 3708 from said subject 3706 exposes a retro-reflecting photo-sensitive element at positions 4203, 4204, or 4205, is shown in FIG. 42. (The retro-reflecting photo-sensitive element 3101 of FIG. 31 is located at any one of the positions indicated by 4203, 4204, or 4205 of FIG. 42.) Said retro-reflecting photo-sensitive element 3101 comprises a layered assembly that includes a photo-sensitive layer 3103 and a retro-reflecting layer 2801 in FIG. 31; it also comprises a photo-sensitive layer support 3104.

A method, for making a 3-dimensional photograph where the subject 3706 is illuminated 3707 and light 3708 from the subject 3706 is reflected by at least one reflective element 4301 and light 3708 from said subject 3706 exposes a retro-reflecting photo-sensitive element at positions 4303, 4304, or 4305, is shown in FIG. 43. (The retro-reflecting photo-sensitive element 3101 of FIG. 31 is located at any one of the positions indicated by 4303, 4304, or 4305 of FIG. 43.) Said retro-reflecting photo-sensitive element 3101 comprises a layered assembly that includes a photo-sensitive layer 3103 and a retro-reflecting layer 2802 in FIG. 31; it also comprises a photo-sensitive layer support 3104.

A method for making a 3-dimensional photograph where the subject 3706 is illuminated 3707 and light 3708 from said subject 3706 exposes a retro-reflecting photo-sensitive element 3701 is shown in FIG. 37. Said retro-reflecting, photo-sensitive element comprises a layered assembly 3701 that includes a photo-sensitive layer 3703 and a retro-reflecting layer 3702; it also comprises a photo-sensitive layer support 3704.

A photographic system for producing a 3-dimensional photograph comprising a retro-reflective photo-sensitive element is shown in FIG. 37. The retro-reflecting photo-sensitive element 3701 comprises a layered assembly that includes a photo-sensitive layer 3703 and a retro-reflecting layer 3702: it also comprises a photo-sensitive layer support 3704.

The use of a retro-reflective element 3702 as an essential element in a photographic system that produces a 3-dimensional photograph is shown in FIG. 37. Said retro-reflective element 3702 is in the form of a sheet. (C1 20,21):

A layered photo-sensitive element 3701 wherein one layer is an angular reflecting layer 3702 and another layer is a photo-sensitive layer 3703 is shown in FIG. 37. The preferred form of said angular reflecting layer 3702 is a retro-reflecting layer.

A photographic system for producing a 3-dimensional photograph comprising a layered photo-sensitive element wherein at least one layer is a photo-sensitive layer and one layer is an angular reflector is shown in FIG. 37.

The layered photo-sensitive element 3701 is shown wherein at least one layer is a photo-sensitive layer 3703 and one layer is an angular reflector 3702. Retro-reflecting layer 3702 is a particular kind of angular reflector. Thus, 3702 is both an angular reflector and a retro-reflecting layer.

I claim the following:

1. A process for making a photograph, where the subject is illuminated with laser light during exposure, is accomplished with a process comprising the following steps:

Step 1 Light from a laser is obtained

Step 2 Said light from the laser is directed to impinge upon a light-diffusing, moving-element; light reflected by said element is diffuse Step 3 The subject being photographed is positioned to be illuminated by diffuse light from said light-diffusing, moving-element Step 4 The subject reflects or transmits the diffuse light with which it is illuminated Step 5 Light from the subject falls on a layered photo-sensitive element which records the image of the subject or the presence of the subject; the photosensitive element is thus exposed Step 6 The exposed photosensitive element is processed, if necessary, and a photograph results.

2. The invention of claim 1 where the said light-diffusing, moving-element rotates.

3. The invention of claim 1, said layered photosensitive element comprising a photosensitive layer and a reflecting layer.

4. The invention of claim 1, said layered photosensitive element comprising a photosensitive layer and a reflecting layer, said reflecting layer is characterized as an angular reflecting layer, and during exposure, light wave interference patterns are present within the photosensitive layer and are recorded by the photosensitive layer.

5. The invention of claim 1, said light from the laser is focused onto the light-diffusing, moving-element.

6. A process for making a photograph, where the subject is illuminated with laser light during exposure, is accomplished with a process comprising the following steps:

Step 1 Light from a laser is obtained

Step 2 Said light from the laser is directed to impinge upon a light-diffusing, moving-element; light transmitted by said element is diffuse Step 3 The subject being photographed is positioned to be illuminated by diffuse light from said light-diffusing, moving-element Step 4 The subject reflects or transmits the diffuse light with which it is illuminated Step 5 Light from the subject falls on a layered photo-sensitive element which records the image of the subject or the presence of the subject; the photosensitive element is thus exposed Step 6 The exposed photosensitive element is processed, if necessary, and a photograph results.

7. The invention of claim 1 where the said light-diffusing, moving-element rotates.

8. The invention of claim 1, said layered photosensitive element comprising a photosensitive layer and a reflecting layer.

9. The invention of claim 1, said layered photosensitive element comprising a photosensitive layer and a reflecting layer, said reflecting layer is characterized as an angular reflecting layer, and during exposure, light wave interference patterns are present within the photosensitive layer and are recorded by the photosensitive layer.

10. The invention of claim 1, said light from the laser is focused onto the light-diffusing, moving-element.

* * * * *